United States Patent
Kato

Patent Number: 6,088,156
Date of Patent: Jul. 11, 2000

[54] FINDER OPTICAL SYSTEM

[75] Inventor: Shigeru Kato, Tachikawa, Japan

[73] Assignee: Olympus Optical Co., Ltd., Tokyo, Japan

[21] Appl. No.: 08/867,756

[22] Filed: Jun. 3, 1997

Related U.S. Application Data

[63] Continuation of application No. 08/266,473, Jun. 27, 1994, abandoned.

[30] Foreign Application Priority Data

| Jun. 28, 1993 | [JP] | Japan | ................................. 5-157110 |
| Dec. 27, 1993 | [JP] | Japan | ................................. 5-332026 |
| May 18, 1994 | [JP] | Japan | ................................. 6-127099 |

[51] Int. Cl.⁷ .................................................. G02B 23/00
[52] U.S. Cl. .................... 359/422; 359/432; 359/423; 359/424; 359/676
[58] Field of Search ..................... 359/422, 421, 359/432, 431, 423, 424, 676; 396/373, 79, 84, 148, 377, 382, 385, 386

[56] References Cited

U.S. PATENT DOCUMENTS

| 5,117,247 | 5/1992 | Nakai et al. ............................. 354/222 |
| 5,132,838 | 7/1992 | Ohshita ................................... 359/422 |
| 5,144,349 | 9/1992 | Kato et al. .............................. 354/222 |
| 5,148,308 | 9/1992 | Miyauchi ................................ 359/432 |
| 5,392,084 | 2/1995 | Kato ....................................... 354/222 |

OTHER PUBLICATIONS

English abstract of Kikuchi Japanese laid open application No. 1-197727, Aug. 1989.

*Primary Examiner*—Cassandra Spyrou
*Assistant Examiner*—Mohammad Y. Sikder
*Attorney, Agent, or Firm*—Pillsbury Madison & Sutro LLP

[57] ABSTRACT

A finder optical system has an objective optical system for forming an intermediate image of an object and an eyepiece optical system, and is disposed independent of a photographing optical system. The objective optical system includes a reflecting member. A lens unit situated on the object side of the intermediate image is used as a correcting lens and moved along the optical axis. The finder optical system is thus corrected for diopter and satisfies a condition:

$$0.1 < |1000 \times \alpha_F / f_R^2| < 7.0$$

where $\alpha F$ is the maximum longitudinal magnification of the correcting lens and $f_R$ is the focal length of the eye-piece optical system.

6 Claims, 29 Drawing Sheets

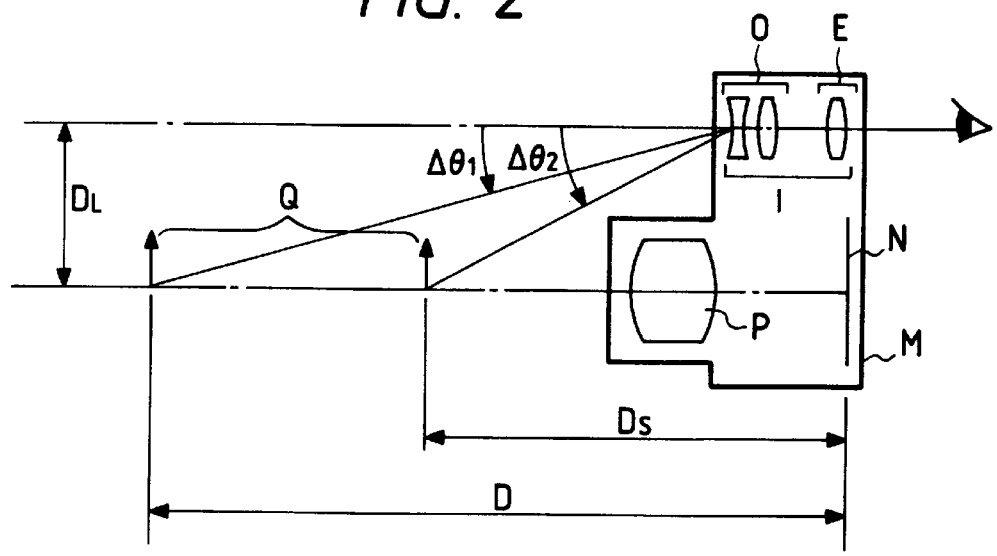
FIG. 2
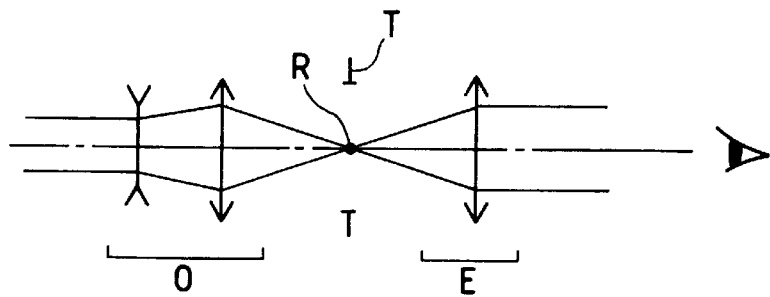
FIG. 3A
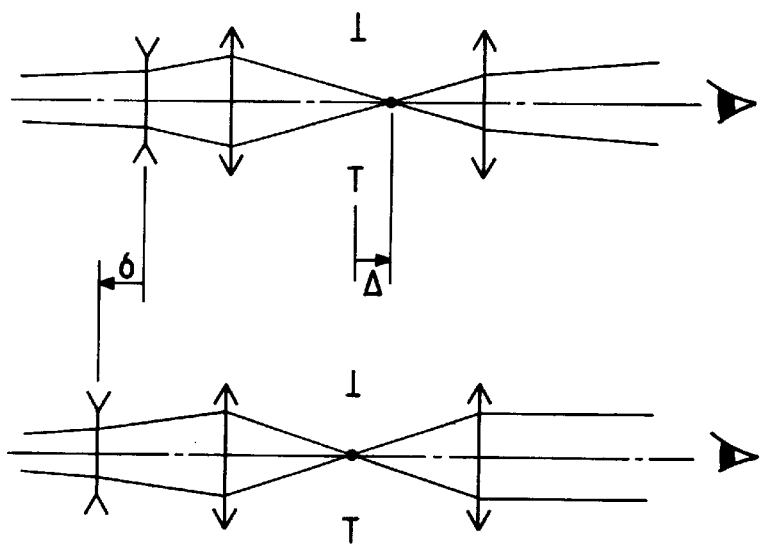
FIG. 3B
FIG. 3C

SPHERICAL ABERRATION
PUPIL DIA. = 2mm

-2.0   2.0
(1/m)

ASTIGMATISM
ω = 23.9°

-2.0   2.0
(1/m)

DISTORTION
ω = 23.9°

-10.   10.
(%)

SPHERICAL ABERRATION
PUPIL DIA. = 2mm

-2.0   2.0
(1/m)

ASTIGMATISM
ω = 16.7°

-2.0   2.0
(1/m)

DISTORTION
ω = 16.7°

-10.   10.
(%)

SPHERICAL ABERRATION
PUPIL DIA. = 2mm

-2.0   2.0
(1/m)

ASTIGMATISM
ω = 10.8°

-2.0   2.0
(1/m)

DISTORTION
ω = 10.8°

-10.   10.
(%)

SPHERICAL ABERRATION
PUPIL DIA. = 2mm

-2.0   2.0
(1/m)

ASTIGMATISM
ω = 23.2°

-2.0   2.0
(1/m)

DISTORTION
ω = 23.2°

-10.   10.
(%)

SPHERICAL ABERRATION
PUPIL DIA. = 2mm

-2.0   2.0
(1/m)

ASTIGMATISM
ω = 16.3°

-2.0   2.0
(1/m)

DISTORTION
ω = 16.3°

-10.   10.
(%)

SPHERICAL ABERRATION
PUPIL DIA. = 2mm

-2.0   2.0
(1/m)

ASTIGMATISM
ω = 10.5°

-2.0   2.0
(1/m)

DISTORTION
ω = 10.5°

-10.   10.
(%)

SPHERICAL ABERRATION
PUPIL DIA. = 2mm

-2.0   2.0
(1/m)

ASTIGMATISM
ω = 24.1°

-2.0   2.0
(1/m)

DISTORTION
ω = 24.1°

-10.   10.
(%)

SPHERICAL ABERRATION
PUPIL DIA. = 2mm

-2.0   2.0
(1/m)

ASTIGMATISM
ω = 15.8°

-2.0   2.0
(1/m)

DISTORTION
ω = 15.8°

-10.   10.
(%)

SPHERICAL ABERRATION
PUPIL DIA. = 2mm

-2.0   2.0
(1/m)

ASTIGMATISM
ω = 10.2°

-2.0   2.0
(1/m)

DISTORTION
ω = 10.2°

-10.   10.
(%)

FIG. 33A
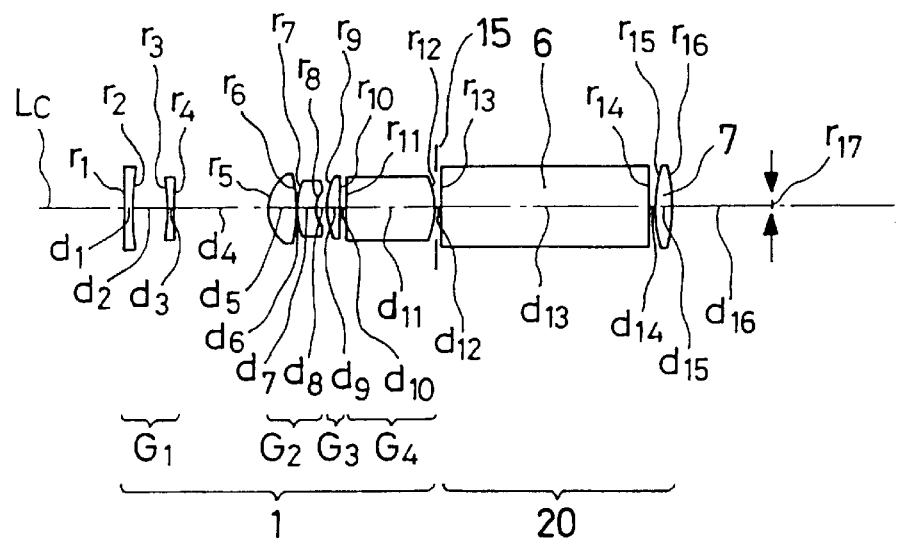
FIG. 33B
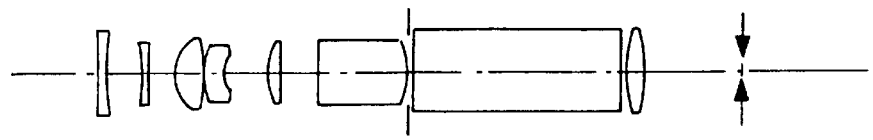
FIG. 34A   FIG. 34B
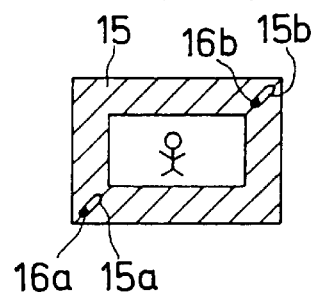 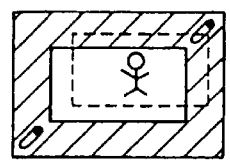
FIG. 35A   FIG. 35B
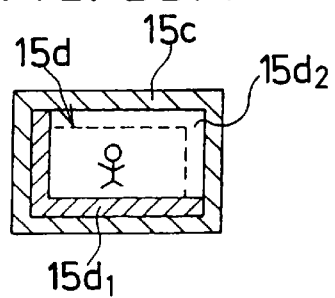 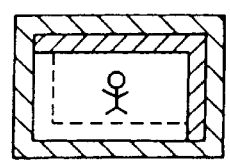

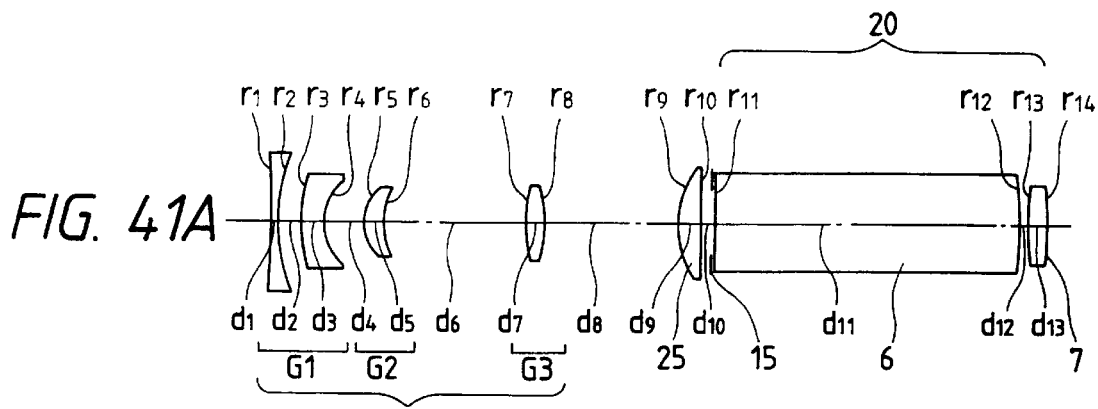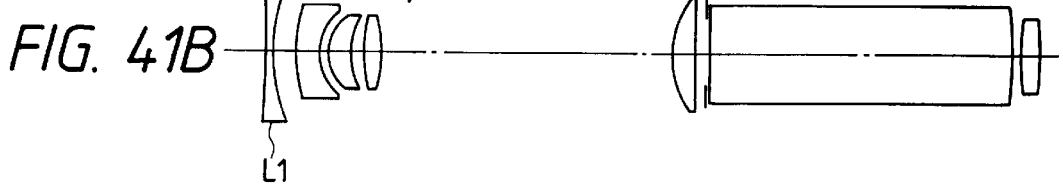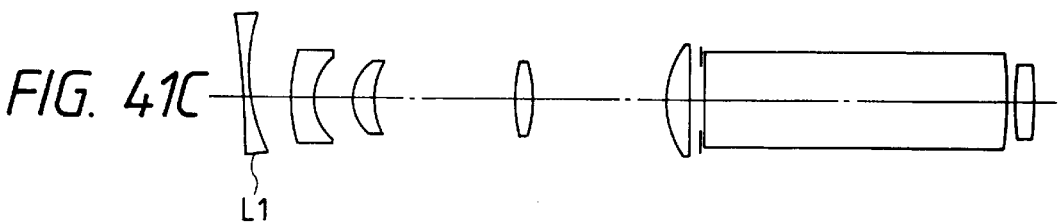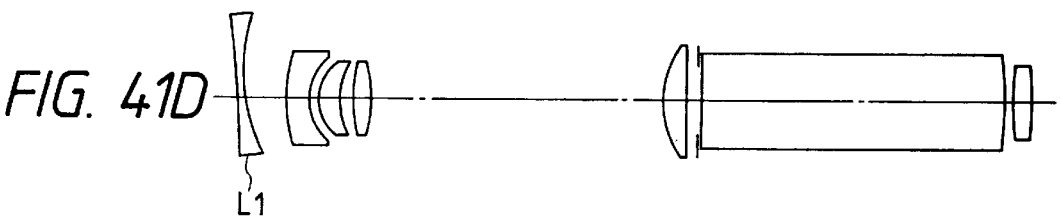

FINDER OPTICAL SYSTEM

This is a continuation of application Ser. No. 08/266,473, filed on Jun. 27, 1994 now abondoned, which was abandoned upon the filling hereof.

BACKGROUND OF THE INVENTION

1. Field of the Invention

This invention relates to a finder optical system for use in photographic cameras, video cameras, etc.

2. Description of the Related Art

In a conventional finder optical system disposed independently of a photographing optical system, it is common that lenses are fixed, irrespective of an object distance, with no focusing function. With such a conventional finder optical system, a photographer, when looking through a finder, unconsciously corrects the positional shift of an aerial image formed through a finder objective optical system by virtue of the focus adjusting function of his eye. In this case, an apparent object distance L' where he sees through the finder, namely a diopter D, is determined by a finder angular magnification 7 and an object distance L and is given by $$D = 1/L' = 1/L \times \gamma^2 [1/m] \tag{1}$$

Since the finder angular magnification $\gamma$ of a camera is generally $\gamma < 1$, a change of diopter with changes in the object distance is less than that in a real field of view, and thus there is no problem that the aerial image is out of focus.

With recent development of compact zoom cameras with high variable magnification, however, the angular magnification $\gamma$ of the finder optical system sometimes becomes larger than 1. In this case, the change of diopter with changes in the object distance is greater than that in the real field of view. This change cannot be corrected by the focus adjusting function of the eye, with the resultant problem that an object is not brought into focus and is hard to see.

Furthermore, it is well known that in the camera in which the finder optical system is disposed independently of the photographing optical system, parallax is produced between the finder and photographing optical systems and thus it is difficult to correctly indicate a photographic range over the entire object distance on the image plane of the finder.

For means of solving the foregoing two problems, it is known that Japanese Patent Preliminary Publication No. Hei 1-197727 discloses the technique that a part of lenses constituting the finder optical system is moved along the optical axis and in a direction perpendicular thereto, based on object distance data, to correct for diopter and parallax at the same time.

According to this technique, however, when the part of lenses constituting the finder optical system is moved along the optical axis, the finder magnification will change and the angle of view of incidence will also change. In the photographing optical system, in which focusing is attended by a change in angle of view, a field factor which is the tangent ratio of the half angle of view of incidence on the photographing optical system to that on the finder optical system will vary widely if the amount of change in angle of view dose not coincide. Consequently, the problem that results is that even though the photographing optical system is made to coincide with the image plane of the finder by correction for diopter, unwanted objects lying outside the field of view of the finder will be photographed, or conversely, objects inside the field of view will not be photographed.

For compact zoom cameras, downsizing of the finder itself is also designed, which is disclosed, for example, by Japanese Patent Preliminary Publication No. Ilei 4-53914. This technique is that the power of each lens of an objective unit is increased and a zoom movement is limited so that a reflecting member for erecting an image can be inserted into an objective path and the size of the entire finder optical system is reduced. The increase of each power of the objective unit, however, may change the properties of the optical system (diopter, parallax, and imaging performance) when the lens unit moves. If, therefore, the method of correcting for diopter and parallax at the same time, set forth in Publication No. Hei 1-197727 previously mentioned, is applied, the lens movement from the infinite distance to the minimum distance will be limited and a complicated driving mechanism will be required to secure the accuracy of correction for diopter and parallax suitable for practical use. This causes the problem of raising the manufacturing cost of the camera. Moreover, because of lens decentering required for correction for parallax, the deterioration of imaging performance sometimes becomes pronounced.

SUMMARY OF THE INVENTION

It is, therefore, a primary object of the present invention to provide a finder optical system which minimizes a change in field factor when corrected for diopter.

It is another object of the present invention to provide a finder optical system which permits correction for parallax as well as for diopter and minimizes a change in field factor when corrected for diopter and parallax.

It is still another object of the present invention to provide a finder optical system which minimizes an error of diopter caused by that of a lens movement for diopter correction.

It is a further object of the present invention to provide a finder optical system which holds fluctuations in aberration to a minimum when corrected for diopter and parallax.

The finder optical system according to the present invention is disposed independent of a photographing optical system and has a reflecting member in the optical path of an objective system. Lens units situated on the object side of an intermediate imaging plane are moved along the optical axis, and when diopter is corrected, the optical system satisfies the condition:

$$0.1 < |1000 \times \alpha F / f_R^2| < 7.0 \tag{2}$$

where $\alpha F$ is the maximum longitudinal magnification of a correcting lens and $f_R$ is the focal length (mm) of an eyepiece system.

Further, the finder optical system according to the present invention is constructed as a variable magnification finder optical system disposed independent of the photographing optical system. A part of lens units situated on the object side of the intermediate imaging plane and integrally constructed in changing magnification is moved along the optical axis, and when diopter is corrected, the optical system satisfies Eq. (2).

Still further, the finder optical system according to the present invention is disposed independent of the photographing optical system and is designed so that a lens unit situated on the object side of the intermediate imaging plane is decentered. For correction for parallax, when parallax is adjusted to an object at an arbitrary infinite distance, the amount of decentering of the lens unit becomes zero, and the lens unit is moved in a direction perpendicular to the optical axis and tilted.

The finder optical system having a function of correcting for field factor according to the present invention has the special features that:

in accordance with the change of the angle of view caused by focusing of the photographing optical system, at least one lens component of the finder optical system is moved to correct for field factor;

at least one lens component situated on the object side of the intermediate imaging plane is moved to correct for diopter and field factor;

a lens component disposed on the object side of the intermediate imaging plane is moved along the optical axis to correct for diopter and satisfies conditions:

$$0.7 \leq P/\Delta\omega T \times \gamma/\gamma' \leq 1.0 \quad (3)$$

$$0.9 \leq 1/\Delta\omega T \times \gamma/\gamma' \leq 1.1 \quad (4)$$

where $\Delta\omega T = \omega T/\tan \omega T$, $\omega T$ is a half angle of view of incidence on a photographic lens in ordinary conditions, $\omega T'$ is a half angle of view of incidence on the photographic lens in correcting for diopter, $\gamma$ is a finder magnification in ordinary conditions, $\gamma'$ is a finder magnification in correcting for diopter, and P is a field factor in ordinary conditions;

at least one lens component situated on the object side of the intermediate imaging plane is decentered to correct for parallax; and parallax is corrected by changing the indication of the field range of the finder optical system.

Additionally, the finder optical system of the present invention includes an objective optical system constructed as a variable magnification system. In accordance with the change of the angle of view caused by focusing of the photographic lens, a lens unit, moved or fixed on change of magnification, of the objective optical system is moved along the optical axis, and thereby correction for diopter is performed. The moving lens unit can also be moved in a direction perpendicular to the optical axis of the finder optical system and inclined.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 2 is a view showing a state where the finder optical system is disposed independent of the photographing optical system in the camera of FIG. 1;

FIGS. 3A, 3B, and 3C are views showing a change of diopter in focusing of a real image mode finder;

FIGS. 33A and 33B are views showing arrangements developed along the optical axis of the finder optical system at wide-angle and telephoto positions, respectively, in a sixth embodiment of the present invention;

FIGS. 34A and 34B are explanatory views showing correction for parallax, based on the movement of a field frame, in ordinary and after-correction states, respectively, in a seventh embodiment of the present invention;

FIGS. 35A and 35B are explanatory views showing correction for parallax, based on the change of indication of a field range, in ordinary and after-correction states, respectively, in an eighth embodiment of the present invention;

FIGS. 41A, 41B, 41C, and 41D are developed views showing arrangements of the finder optical system at the wide-angle position for an infinite object point, telephoto position for an infinite object point, wide-angle position for object point 1 m, and telephoto position for object point 1 m, respectively, in the eleventh embodiment;

DETAILED DESCRIPTION OF THE PREFERRED EMBODIMENTS

Before undertaking the explanation of the embodiments, it will be expedient to describe the general function of the finder optical system according to the present invention.

Figure 1:
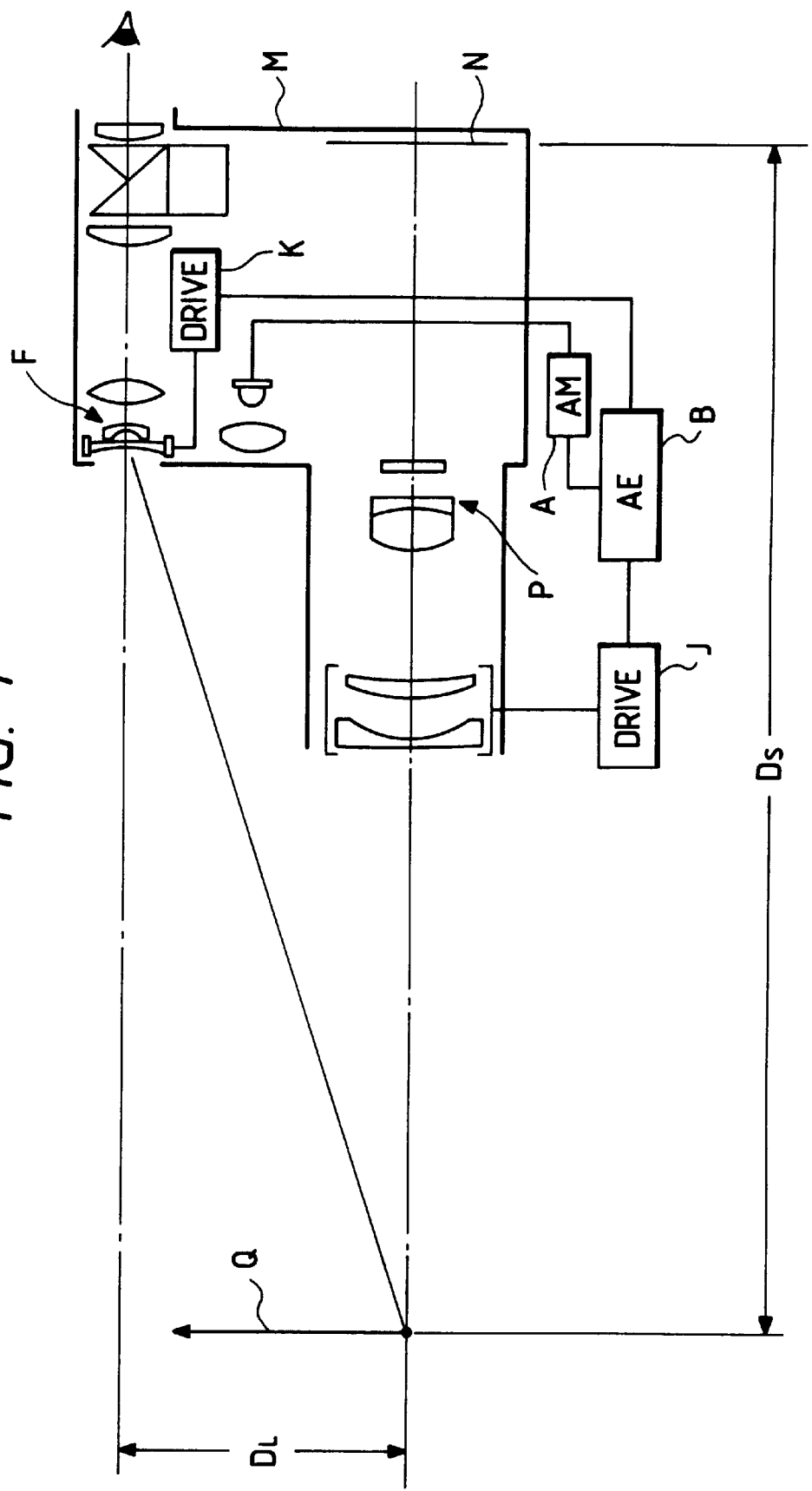
FIG. 1 is a view showing the construction of a camera incorporating a finder optical system according to the present invention.

A camera housing the finder optical system of the present invention, as depicted in FIG. 1, includes a photographic lens P, a finder F, and focus detectors. Specifically, focus detection is performed by an autofocus mechanism A and the calculation of the lens movement is made by an arithmetical element B. Driving systems J and K serve to move the photographic lens P and a part of lense of the finder F. The photographic lens P and the finder F are arranged so that their optical axes are parallel to each other.

In the finder optical system disposed separate from the photographing optical system, a part of the lenses contained in a finder objective system is moved, as a diopter correcting lens, along the optical axis, and when focusing is performed, that is, correction for diopter is made, the movement of the diopter correcting lens and a diopter change (diopter shift) are given by relations:

$$\alpha f = M_F^2 - Mc^2 \quad (5)$$

$$\Delta S = \alpha F \times \Delta d \quad (6)$$

$$\Delta D = -1000 \times \Delta s / f_R^2 \quad (7)$$

From Eqs. (6) and (7), the following relation is obtained:

$$|\Delta D / \Delta d| = 1000 \times 60 \, F / f R^2| \quad (8)$$

where $M_F$ is the lateral magnification of an optical system situated between the correcting lens (inclusive) and an intermediate image, $M_C$ is the lateral. magnification of an optical system situated between the correcting lens and the intermediate image, Ad is the movement of the diopter correcting lens (mm), $\Delta s$ is the shift of the imaging position at the intermediate imaging position (mm), and $\Delta D$ is a diopter shift ($m^{-1}$).

The ratio $\Delta D/\Delta d$ represents a sensitivity to the diopter change, and the tolerance on lens driving increases with decreasing absolute value of this ratio. Although the focal length fR of the eyepiece system depends on a lens specification, the maximum longitudinal magnification $\alpha F$ of the correcting lens can be set by adjusting the focal length of the correcting lens. Since in general the longitudinal magnification of a lens with weak power is low, a lens unit with weak power is disposed in the finder objective optical system, for example, by separating a zoom lens unit, so that the maximum longitudinal magnification aF satisfies Eq. (2). In this way, a correcting lens whose sensitivity $\Delta D/\Delta d$ is small can be secured.

If the upper limit of Eq. (2) is exceeded, considerable accuracy will be required to drive the correcting lens, while if the lower limit is passed, an excess of movement of the correcting lens will cause oversizing of the finder optical system.

Next, reference is made to correction for parallax. Lens decentering is available in shift and tilt techniques. The tilt decentering brings about a slight change of a refracting surface on the optical axis and has little effect on bending of the optical axis. The shift decentering, by contrast, can produce a prismatic effect on the optical axis and has a significant effect on bending of the optical axis. Hence, correction for parallax can usually be made only by the shift decentering. If a lens with low power is used for correction for parallax, an angular change of the optical axis in a constant amount of shift will be limited, and thus the tolerance on a shift driving system can be moderated. Although corrections for diopter and parallax can be made by different lens units, it is desirable that both corrections are made by a single lens unit in order to reduce the number of parts of mechanism.

Further, a description is given of imaging performance. Because a lens decentered is used, it is unavoidable that the degradation of imaging performance is caused in accordance with the amount of decentering. In order to minimize the degradation of imaging performance, it is considered to make the absolute vale of decentering small or improve imaging performance with another lens decentering.

Now, discussions are made as to means for diminishing the absolute value of decentering. If a lens is not decentered at an infinite object point, but only at the minimum distance, the maximum amount of decentering will increase and the degradation of imaging performance becomes pronounced. The amount of decentering for correcting diopter is practically proportional to the reciprocal of the object distance L, 1/L. If, therefore, decentering is set to zero in the neighborhood of the intermediate point relating to 1/L of the entire object distance, the amount of decentering will be separated on the infinite distance side and the minimum distance side, and the maximum absolute value of decentering can be reduced to about half. Consequently, the degradation of imaging performance can be decreased.

Since in general an object is fine at a distant view and rough at a near view, it is rather favorable in practical use to make much account of imaging performance at a distant view. Hence, it is desirable to satisfy the condition:

$$0.3 < L_{MIN}/L_{DECO} < 0.7 \quad (9)$$

where $L_{DECO}$ is an object distance where the amount of decentering of the correcting lens becomes zero and $L_{MIN}$ is the most minimum object distance. If the upper limit of Eq. (9) is exceeded, deterioration in imaging performance at an infinite distance will increase, while beyond the lower limit, that at the minimum distance will increase.

For decentering except that mentioned above, the method of improving performance is explained below. The shift decentering for correcting parallax will tilt the intermediate image plane. As a result, the diopter in the visual field is not kept constant and the image is hard to see. If the tilt decentering is adopted to correct the tilt of the intermediate image plane, the diopter in the visual field can be kept constant. As mentioned above, the tilt decentering has little effect on correction for the optical axis, thus improving only performance without adversely affecting correction for diopter.

In correction for parallax by the tilt decentering in the finder optical system of the present invention, the center of rotation of a lens unit on the object side of an approximate position where the intermediate imaging plane is formed lies on the intermediate imaging plane side. The lens unit on the object side of the approximate position where the intermediate imaging plane is formed moves along a circular arc drawn round the center of rotation, and thereby parallax is corrected.

Next, reference is made to the changes of the finder magnification and the angle of view in the finder optical system. When the amount of correction for diopter is represented by $\Delta D_C$ and is made equal to the diopter shift, correction for diopter will favorably be made. This can be expressed as $$\Delta D_C = \Delta D \quad (10)$$

From Eqs. (6) and (7), the following equation is derived:

$$\Delta d = \Delta D_C / 1000 \times f_R^2 / \alpha F \quad (11)$$

When the movement $\Delta d$ has a minus value, the lens is shifted forward. A plus value means a backward shift. For example, when the object distance changes from the infinity to the minimum, the amount of diopter shift $\Delta D$ becomes minus, while the amount of correction for diopter $\Delta D_C$ becomes plus. If, therefore, the longitudinal magnification $\alpha F$ of the correcting lens component has a minus value, the lens is shifted forward, and if plus, the lens is shifted backward.

If the lens is moved along the optical axis for diopter correction, the paraxial relationship of the objective system will change and its focal length will also change. Since in this case the focal length of the eyepiece system remains constant, the finder magnification $\gamma$ also alters only for the change of the objective system.

Also, if a part of lens units constituting the finder objective system is decentered, the finder optical axis will be inclined. In this way, parallax with the photographing optical system can be corrected. In such a case, a lens unit except that for diopter correction may be decentered and the lens unit for diopter correction may also be decentered at the same time it is moved along the optical axis.

A half angle of view of incidence on the finder, $\omega F$, can be derived from an intermediate image height I and a focal length of the objective system, $f_{OB}$, as $\omega F = \tan^{-1}(I/f_{OB})$. Thus, if the focal length $f_{OB}$ increases, the angle $\omega F$ becomes narrow, and if, conversely, the focal length $f_{OB}$ decreases, the angle $\omega F$ becomes wider. Thus, when correction for diopter is made by a lens unit such that where the angle of view of the photographing optical system is narrow (or wide) in focussing, the finder magnification increases (or decrease), the angle of view $\omega F$ becomes narrower (or wider) and the variation of the field factor can be held to a minimum.

For the field factor after correction for diopter, it is favorable to satisfy Eq. (3). If, however, the value of Eq. (3) passes the lower limit, the field factor will decreases and unwanted objects outside the finder field will be photographed. Beyond the upper limit, the field factor will be increased to 100% or more and consequently, even objects in the visual field may not be photographed.

Furthermore, it is desirable that the field factor after correction for diopter satisfies Eq. (4). However, if the value of Eq. (4) exceeds the upper or lower limit, the field factor will be considerably changed due to the object distance.

Subsequently, mention will be made of a moving lens for lessening the variation of the field factor relative to correction for diopter.

As shown in FIG. 2, the finder F is disposed independent of the photographic lens P, and their incidence sections are separated by a distance $D_L$ in front of a camera M. For this reason, parallax varies with the object distance. Reference symbol D denotes the object distance, $D_S$ denotes the minimum distance, and $\Delta\theta_1$ and $\Delta\theta_2$ each represent parallax. Symbols N and Q designate a film surface and an object, respectively.

This finder is constructed as a real image mode finder including a positive objective system 0 and a positive eyepiece system E, and is provided with a field stop (a field frame) defining the field range in the vicinity of the intermediate image formed by the objective system.

FIGS. 3A, 3B, and 3C are diagrams showing the paraxial power configurations of the finder optical system. FIG. 3A shows the case where the object distance is long, and FIGS. 3B and 3C show the cases where the object distance is shorter. The objective system includes a negative power and a positive power. When the object is close, as shown in FIG. 3B, the intermediate image position is shifted backward by $\Delta$ and thus the parallax of the finder changes. In order to correct this parallax change, as depicted in FIG. 3C, when a part of the lens units (a negative power in this case) of the objective system is moved along the optical axis by $\gamma$ for focussing, the paraxial relationship of the objective system changes and the focal length of the objective system also changes in response to the shift of the intermediate image position R. Because the focal length of the eyepiece system is constant, the finder magnification $\gamma$ changes only for the change of the focal length of the objective system. Moreover, since the aperture diameter of the frame member determining the intermediate image height I is also constant, the half angle of view $\omega F$ can be approximated from the focal length $f_{OB}$ of the objective system by $\omega F = \tan^{-1}(I/f_{OB})$. Hence, if the focal length $f_{OB}$ in creases, the finder magnification $\gamma$ becomes high and the half angle of view $\omega F$ decreases. Conversely, if the focal length $f_{OB}$ decreases, the finder magnification $\gamma$ becomes lower and the half angle of view $\omega F$ increases. Thus, diopter correction is made by a lens such that where the angle of view of the photographic lens becomes narrow by focusing, the finder magnification decreases, or where the angle of view becomes wider, the finder magnification increases. Consequently, changes in the angles of view of the photographic lens and the finder show almost the same tendency, and the change of the field factor can thus be limited. In the figures, symbol T represents a field frame.

Where diopter correction is made by the headmost lens of the objective system, the relationship between the object distance and the lens movement is always constant, irrespective of a zoom condition. For this reason, the lens movement can be uniquely determined only from the focus detection data and the focusing data of the photographing optical system, with the resultant simplification of the arithmetical system.

Figure 4A:
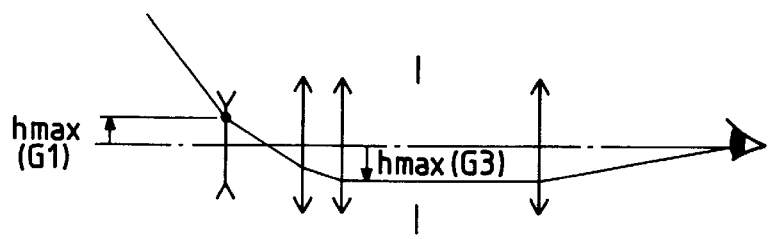
FIGS. 4A, 4B, and 4C are views showing the relationships between the movement of lenses of the objective system and the maximum ray height where the diopter of the finder is adjusted.
Figure 4B:
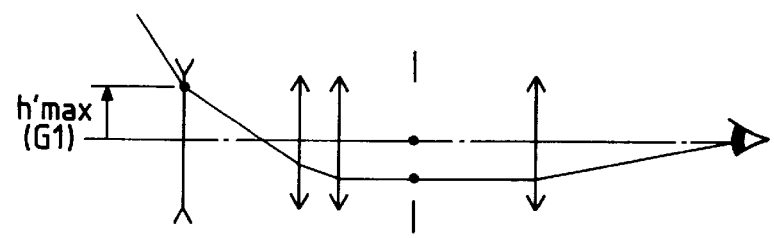
Figure 4C:
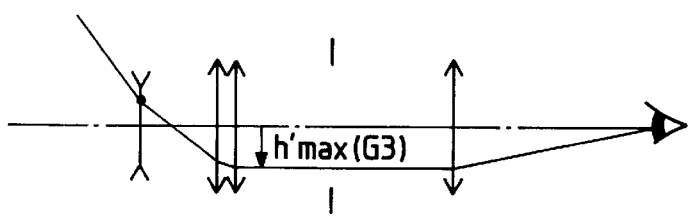

FIGS. 4A, 4B, and 4C show the relationship between the lens movement of the objective system and the maximum ray height Hmax at the lens surface. In this case, the objective system is roughly divided into powers of negative, positive, and positive. In these figures, if a front lens is shifted, as shown in FIG. 4B, from a state in FIG. 4A, the maximum ray height $h_{max}$ will increase and the outer diameter of the lens must be enlarged. If, however, as shown in FIG. 4C, the internal lenses or the rear lens of the objective system is moved to correct the diopter and field factor, marginal rays will be collected by a lens situated in front of that moving for correction. Thus, even when the front lens is moved along the optical axis, the change of the maximum ray height $H_{max}$ is slight and the outer diameter of the lens need not be enlarged.

In the present invention, where parallax as well as diopter is corrected, a proper lens in the objective system is decentered with respect to the finder optical system. Alternatively, the frame member (field frame) provided for defining the visual field of the finder system may well be moved in a direction perpendicular to the optical axis.

In this way, when an arrangement is such that diopter and parallax are corrected at the same time, the visual field observed through the finder coincides more exactly with that photographed by the photographic lens.

Referring to the drawings, the embodiments of the present invention will be explained in detail below.

First Embodiment

In FIGS. 5A–5C and 6A–6C showing the first embodiment, reference numeral 1 represents a finder objective system; 2 a first lens unit; 3 a second lens unit; and 4 a third lens unit. Numerals 5 and 6 denote prisms as reflecting members for erecting an image, inserted in the optical path after an objective system. Numeral 7 designates an eyepiece constituting an eyepiece system and 8 designates an approximate position where an intermediate imaging plane is formed and a field frame, not shown, is disposed. Numeral 9 represents an eyepoint.

In the first embodiment, the first lens unit 2 is divided into two negative lenses 2a and 2b so that corrections for diopter and parallax are made by the negative lens 2b which is lower in longitudinal magnification. The lens units 3 and 4 are moved along the optical axis. In this case, since the amount of movement is 0.72 mm and the amount of shift is 2.9 mm, tolerance required for driving the correcting lens can be reduced to about ⅓. Since the amount of shift decentering is divided, with a center at the object distance L=1.2 m, the maximum absolute value of decentering becomes 1.5 mm. This improves the tilt of the imaging plane in decentering lens.

The lens data of the first embodiment are shown below. Symbols $D_1$ to $D_4$ represent variable lens spacings on the optical axis.

| | | | | | |
|---|---|---|---|---|---|
| r1 = | 427.621 | | | | |
| | d1 = | 1.0 | n1 = 1.5842 | v1 = | 30.5 |
| r2 = | 21.907 | | | | |
| | d2 = | D1 | | | |
| r3 = | −26.983 | | | | |
| | d3 = | 1.0 | n3 = 1.5842 | v3 = | 30.5 |
| r4 = | 97.412 (aspherical) | | | | |
| | d4 = | D2 | | | |
| r5 = | 5.25 (aspherical) | | | | |
| | d5 = | 3.7 | n5 = 1.4924 | v5 = | 57.7 |
| r6 = | −25.997 | | | | |
| | d6 = | 0.2 | | | |
| r7 = | 11.548 | | | | |
| | d7 = | 2.41 | n7 = 1.5842 | v7 = | 30.5 |
| r8 = | 3.9 | | | | |
| | d8 = | D3 | | | |

-continued

| | | | | | |
|---|---|---|---|---|---|
| r9 = | 9.536 (aspherical) | | | | |
| | d9 = | 1.75 | n9 = 1.4924 | v9 = | 57.7 |
| r10 = | 108.896 | | | | |
| | d10 = | D4 | | | |
| r11 = | ∞ | | | | |
| | d11 = | 12.0 | n11 = 1.4924 | v11 = | 57.7 |
| r12 = | −11.586 | | | | |
| | d12 = | 0.7 (field frame position) | | | |
| r13 = | ∞ | | | | |
| | d13 = | 29.0 | n13 = 1.4924 | v13 = | 57.7 |
| r14 = | ∞ | | | | |
| | d14 = | 0.7 | | | |
| r15 = | 17.326 (aspherical) | | | | |
| | d15 = | 2.3 | n15 = 1.4924 | v15 = | 57.7 |
| r16 = | −24.527 | | | | |
| | d16 = | 15.0 | | | |
| r17 = | (eyepoint) | | | | |

| Aspherical coefficients |
|---|
| Fourth surface (r4) |

K = 0
E = $0.11783 \times 10^{-3}$,   F = $-0.11803 \times 10^{-4}$,
G = $0.20704 \times 10^{-6}$ Fifth surface (r5)

K = 0
E = $-0.86055 \times 10^{-3}$,   F = $-0.51448 \times 10^{-5}$,
G = $-0.10653 \times 10^{-5}$ Ninth surface (r9)

K = 0
E = $0.39471 \times 10^{-3}$,   F = $-0.36821 \times 10^{-4}$,
G = $0.14630 \times 10^{-5}$ Fifteenth surface (r15)

K = 0
E = $-0.11542 \times 10^{-3}$,   F = $0.34242 \times 10^{-5}$,
G = $-0.69852 \times 10^{-7}$ Table 1 gives the data of the magnification, angle of view of incidence, variable spacing, shift, tilt, etc.

TABLE 1

| | Wide-angle position | Middle position | Telephoto position |
|---|---|---|---|
| Magnification | 0.50 | 0.75 | 1.13 |
| Angle of view (°) | 23.9 | 16.7 | 10.8 |
| L = ∞ | | | |
| D1 (mm) | 2.852 | 2.852 | 2.852 |
| D2 (mm) | 12.510 | 6.529 | 1.309 |
| Shift (mm) | −1.4 | −1.4 | −1.4 |
| Tilt (°) | 0.0 | 0.0 | 0.0 |
| L = 0.6 | | | |
| D1 (mm) | 2.137 | 2.137 | 2.137 |
| D2 (mm) | 13.225 | 7.244 | 2.024 |
| Shift (mm) | 1.5 | 1.5 | 1.5 |
| Tilt (°) | 0.0 | 0.0 | 0.0 |
| Unit spacing | | | |
| D3 (mm) | 3.015 | 6.361 | 5.274 |
| D4 (mm) | 1.067 | 3.702 | 10.009 |

Figure 7A:
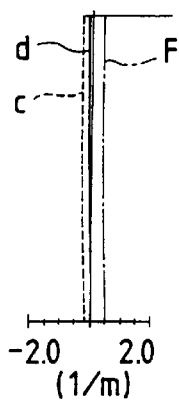
FIGS. 7A, 7B, and 7C are diagrams showing aberration curves at the wide-angle position where the object distance is 1.2 m and no lens unit is decentered in the first embodiment.
Figure 7B:
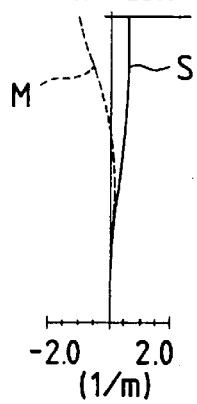
Figure 7C:
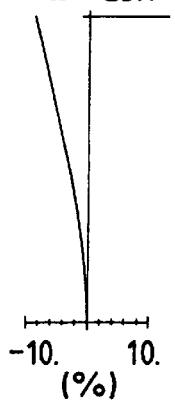

FIGS. 7A, 7B, and 7C are diagrams showing aberration curves at the wide-angle position where the object distance is 1.2 m and no lens unit is decentered in the first embodiment.

Figure 8A:
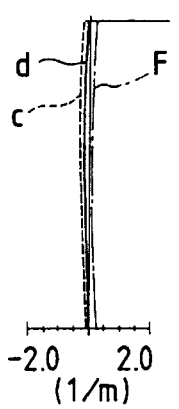
FIGS. 8A, 8B, and 8C are diagrams showing aberration curves at the middle position where the object distance is 1.2 m and no lens unit is decentered in the first embodiment.
Figure 8B:
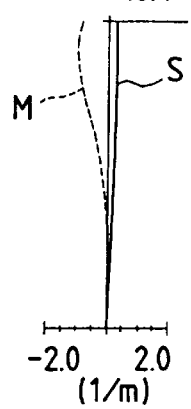
Figure 8C:

FIGS. 8A, 8B, and 8C are diagrams showing aberration curves at the middle position where the object distance is 1.2 m and no lens unit is decentered in the first embodiment.

Figure 9A:
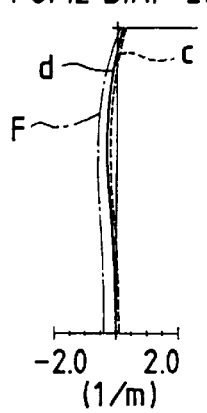
FIGS. 9A, 9B, and 9C are diagrams showing aberration curves at the telephoto position where the object distance is 1.2 m and no lens unit is decentered in the first embodiment.
Figure 9B:
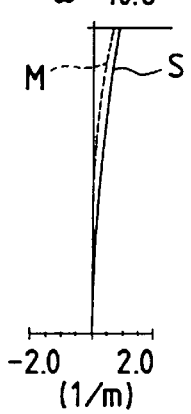
Figure 9C:
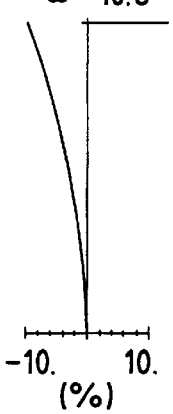

FIGS. 9A, 9B, and 9C are diagrams showing aberration curves at the telephoto position where the object distance is 1.2 m and no lens unit is decentered in the first embodiment.

Figure 10A:
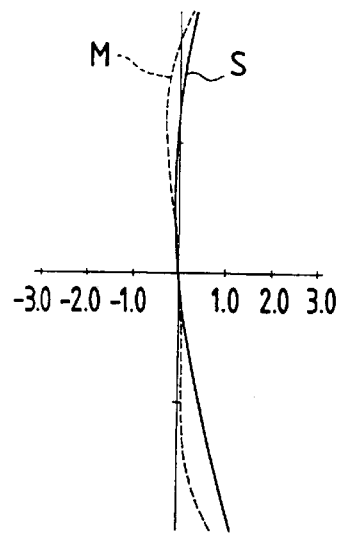
FIGS. 10A, 10B, and 10C are aberration curve diagrams showing the tilt of an imaging plane at wide-angle, middle, and telephoto positions, respectively, where the object distance is infinite in the first embodiment.
Figure 10B:
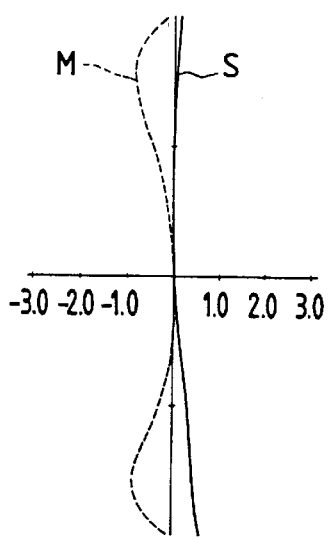
Figure 10C:
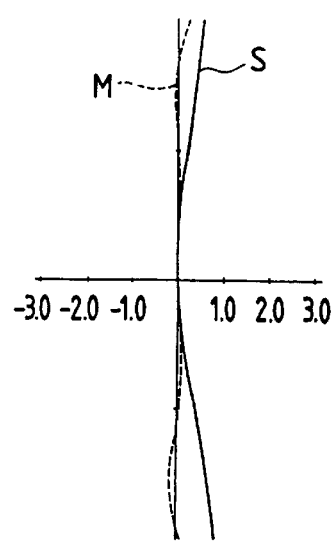

FIGS. 10A, 10B, and 10C are aberration curve diagrams showing the tilt of an imaging plane at wide-angle, middle, and telephoto positions, respectively, where the object distance is infinite in the first embodiment.

Figure 11A:
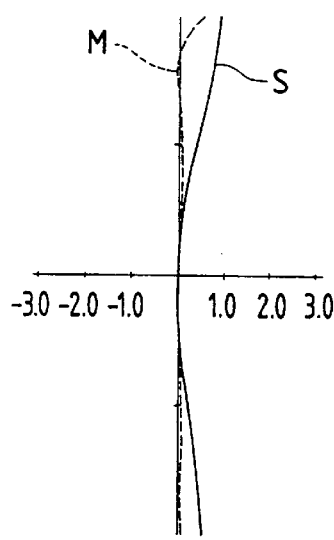
FIGS. 11A, 11B, and 11C are aberration curve diagrams showing the tilt of an imaging plane at wide-angle, middle, and telephoto positions, respectively, where the object distance is 0.6 m in the first embodiment.
Figure 11B:
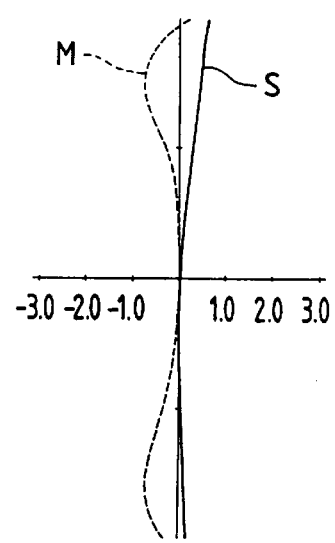
Figure 11C:
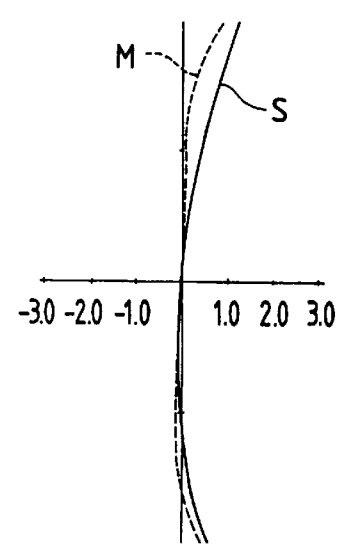

FIGS. 11A, 11B, and 11C are aberration curve diagrams showing the tilt of an imaging plane at wide-angle, middle, and telephoto positions, respectively, where the object distance is 0.6 m in the first embodiment.

Figure 12A:
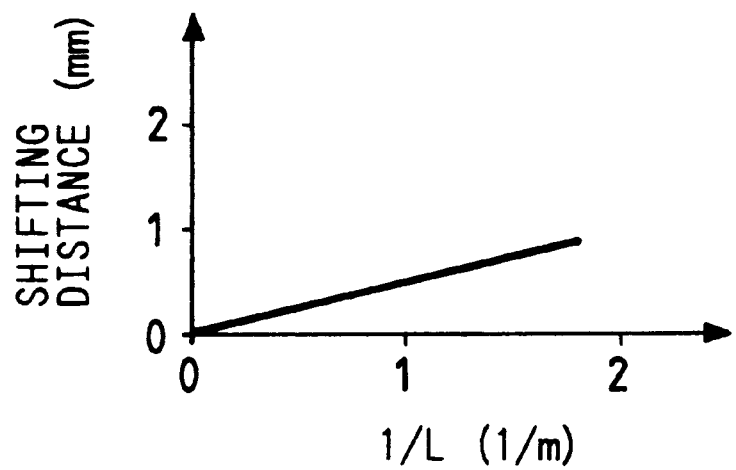
FIGS. 12A and 12B are graphs showing the relationships between the object distance and the lens movement in the first embodiment.
Figure 12B:
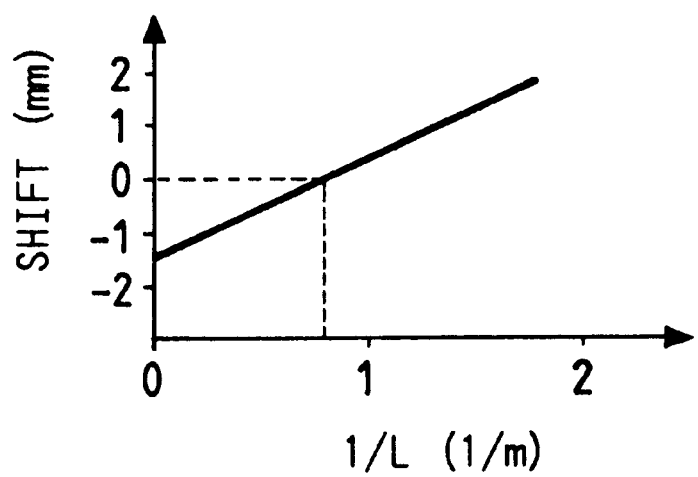
Figure 13A:
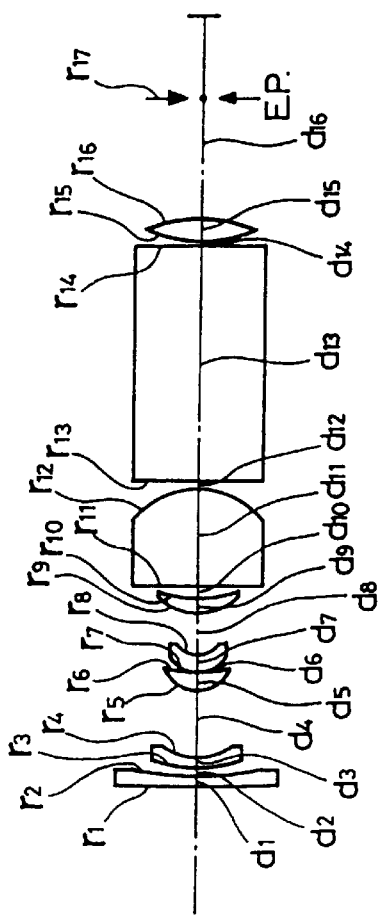
FIGS. 13A, 13B, and 13C are views showing arrangements developed along the optical axis of the finder optical system at wide-angle, middle, and telephoto positions, respectively, where an object distance is infinite in a second embodiment of the present invention.
Figure 13B:
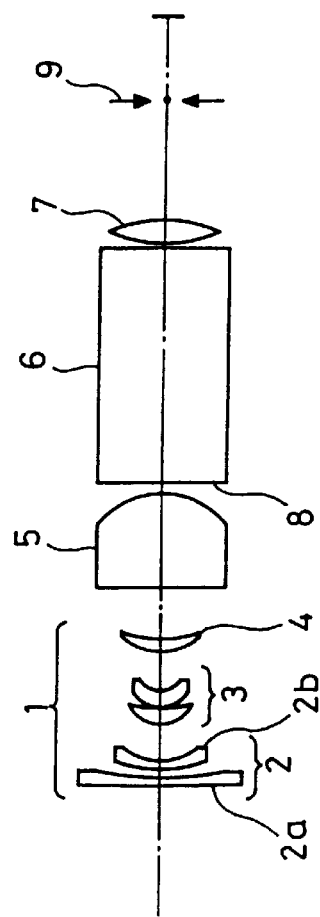
Figure 13C:
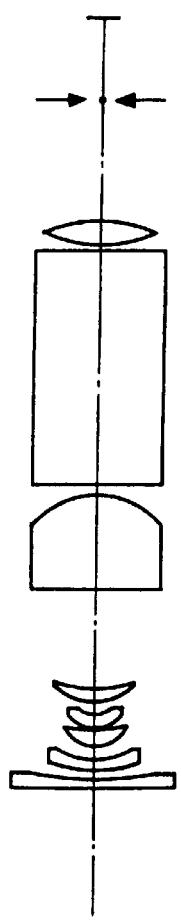
Figures 14A, 14B, 14C:
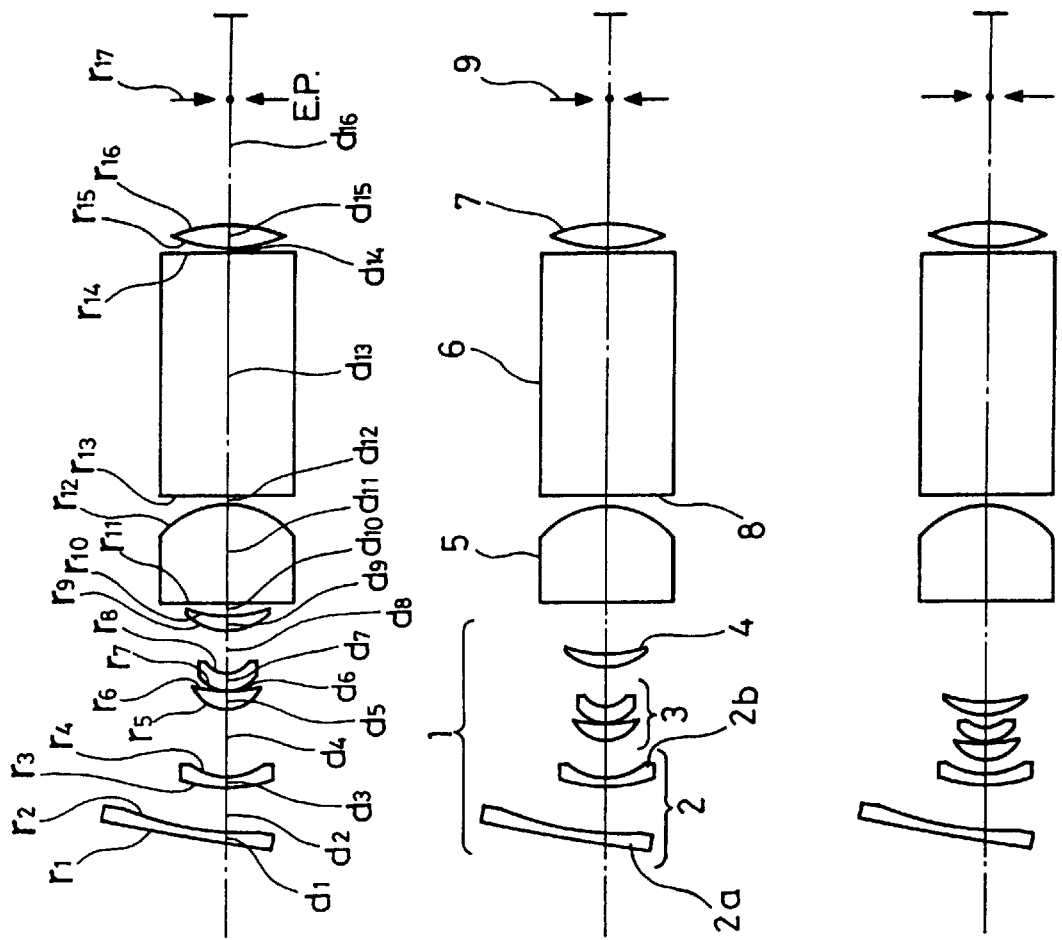
FIGS. 14A, 14B, and 14C are views showing arrangements developed along the optical axis of the finder optical system at wide-angle, middle, and telephoto positions, respectively, where the object distance is 0.6 m in the second embodiment.

FIGS. 12A and 12B are graphs showing the relationships between the object distance and the lens movement in the first embodiment.

Second Embodiment

In the second embodiment, as shown in FIGS. 13A–13C and 14A–14C, the first lens unit 2 is divided into two negative lenses 2a and 2b so that corrections for diopter and parallax are made by the negative lens 2a which is lower in longitudinal magnification. The lens units 3 and 4 are moved along the optical axis. In this case, since the amount of shifting distance is 3.92 mm and the amount of shift is 4.9 mm, tolerance required for driving the correcting lens can be reduced to a considerable extent. In this embodiment, the correcting lens is tilted at the same time it is shifted in order to correct the inclination of the image plane when the lens is decentered. The amount of tilt is 10.4°. In this case, the center of rotation is apparently situated on the intermediate imaging plane side of the correcting lens so that it is rotated along the circular arc.

The lens data of the second embodiment are shown below. Symbols $D_1$ to $D_4$ denote variable spacings on the optical axis.

```
r1 =   245.378
           d1 =   1.0        n1 =  1.7495   v1 =  35.3
r2 =    35.174
           d2 =   D1
r3 =    18.279
           d3 =   1.0        n3 =  1.5842   v3 =  30.5
r4 =     6.306 (aspherical)
           d4 =   D2
r5 =     3.965 (aspherical)
           d5 =   2.15       n5 =  1.4924   v5 =  57.7
r6 =     9.637
           d6 =   0.2
r7 =     4.404
           d7 =   1.69       n7 =  1.5842   v7 =  30.5
r8 =     3.215
           d8 =   D3
r9 =     6.095 (aspherical)
           d9 =   1.67       n9 =  1.4924   v9 =  57.7
r10 =   20.060
          d10 =   D4
r11 =   ∞
          d11 =  12.0       n11 =  1.4924  v11 =  57.7
r12 =  -10.0
          d12 =   0.7 (field frame position)
r13 =   ∞
          d13 =  29.0       n13 =  1.4924  v13 =  57.7
r14 =   ∞
          d14 =   0.7
r15 =   17.326 (aspherical)
          d15 =   2.3       n15 =  1.4924  v15 =  57.7
r16 =  <24.527
          d16 =  15.0
r17 =   (eyepoint)
```

-continued

Aspherical coefficients

Fourth surface (r4)

K = 0
E = $-0.37276 \times 10^{-3}$,  F = $-0.64862 \times 10^{-4}$,
G = $0.19591 \times 10^{-5}$ Fifth surface (r5)

K = 0
E = $-0.16325 \times 10^{-2}$,  F = $-0.27338 \times 10^{-4}$,
G = $-0.68383 \times 10^{-5}$ Ninth surface (r9)

K = 0
E = $-0.69155 \times 10^{-3}$,  F = $-0.31109 \times 10^{-4}$,
G = $0.69023 \times 10^{-6}$ Fifteenth surface (r15)

K = 0
E = $-0.11542 \times 10^{-3}$,  F = $0.34242 \times 10^{-5}$,
G = $-0.69852 \times 10^{-7}$ Table 2 gives the data of the magnification, angle of view of incidence, variable spacing, shift, tilt, etc.

TABLE 2

|  | Wide-angle position | Middle position | Telephoto position |
|---|---|---|---|
| Magnification | 0.50 | 0.75 | 1.13 |
| Angle of view (°) | 23.2 | 16.3 | 10.5 |
| L = ∞ | | | |
| D1 (mm) | 1.064 | 1.064 | 1.064 |
| Shift (mm) | 0.0 | 0.0 | 0.0 |
| Tilt (°) | 0.0 | 0.0 | 0.0 |
| L = 0.6 m | | | |
| D1 (mm) | 4.988 | 4.988 | 4.988 |
| Shift (mm) | 4.9 | 4.9 | 4.9 |
| Tilt (°) | -10.4 | -10.4 | -10.4 |
| Unit spacing | | | |
| D2 (mm) | 8.562 | 4.294 | 1.864 |
| D3 (mm) | 5.573 | 5.093 | 1.469 |
| D4 (mm) | 1.322 | 6.070 | 12.124 |

Figure 15A:
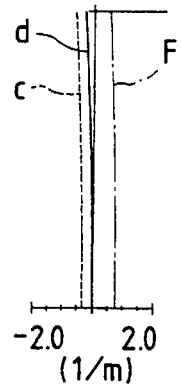
FIGS. 15A, 15B, and 15C are diagrams showing aberration curves at the wide-angle position where the object distance is infinite and no lens unit is decentered in the second embodiment.
Figure 15B:
Figure 15C:
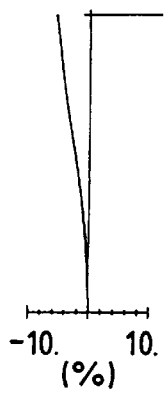

FIGS. 15A, 15B, and 15C are diagrams showing aberration curves at the wide-angle position where the object distance is infinite and no lens unit is decentered in the second embodiment.

Figure 16A:
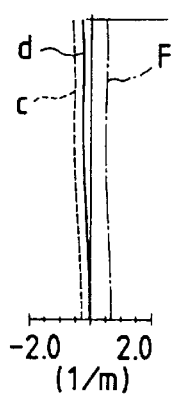
FIGS. 16A, 16B, and 16C are diagrams showing aberration curves at the middle position where the object distance is infinite and no lens unit is decentered in the second embodiment.
Figure 16B:
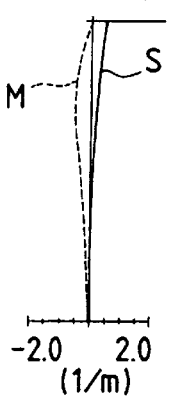
Figure 16C:

FIGS. 16A, 16B, and 16C are diagrams showing aberration curves at the middle position where the object distance is infinite and no lens unit is decentered in the second embodiment.

Figure 17A:
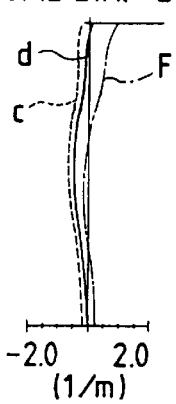
FIGS. 17A, 17B, and 17C are diagrams showing aberration curves at the telephoto position where the object distance is infinite and no lens unit is decentered in the second embodiment.
Figure 17B:
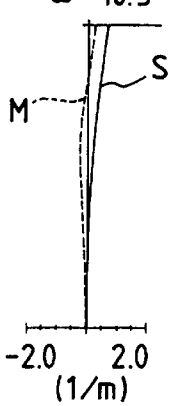
Figure 17C:
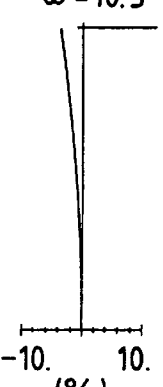

FIGS. 17A, 17B, and 17C are diagrams showing aberration curves at the telephoto position where the object distance is infinite and no lens unit is decentered in the second embodiment.

Figure 18A:
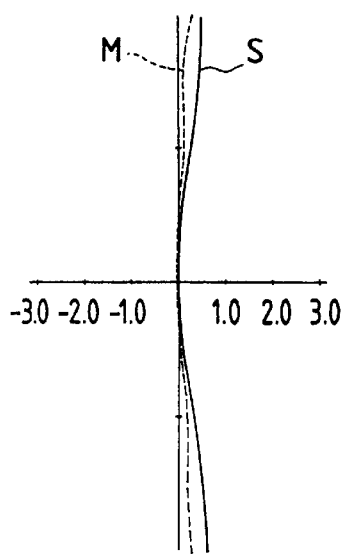
FIGS. 18A, 18B, and 18C are aberration curve diagrams showing the tilt of an imaging plane at wide-angle, middle, and telephoto positions, respectively, where the object distance is 0.6 m in the second embodiment.
Figure 18B:
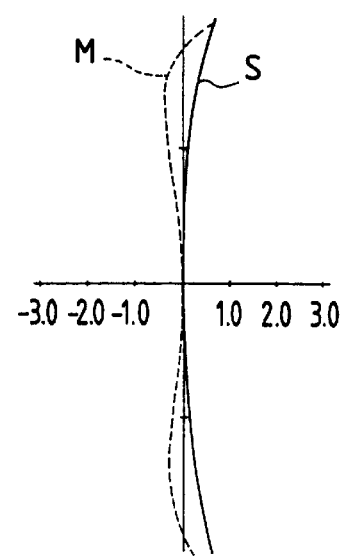
Figure 18C:
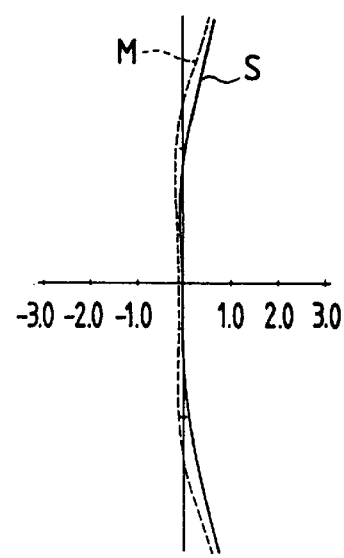
Figure 19A:
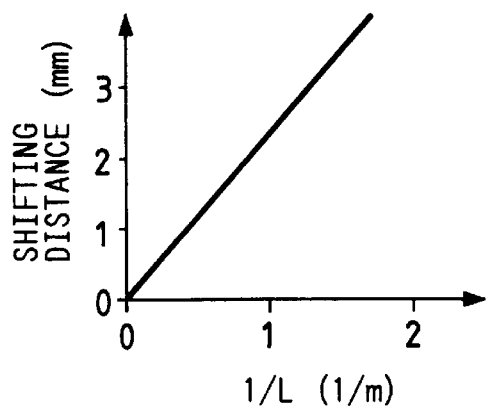
FIGS. 19A, 19B, and 19C are graphs showing the relationships between the object distance and the lens movement in the second embodiment.
Figure 19B:
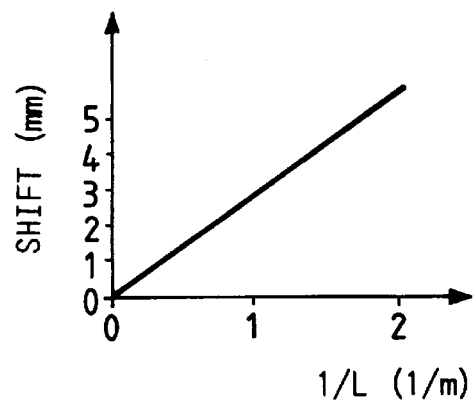
Figure 19C:
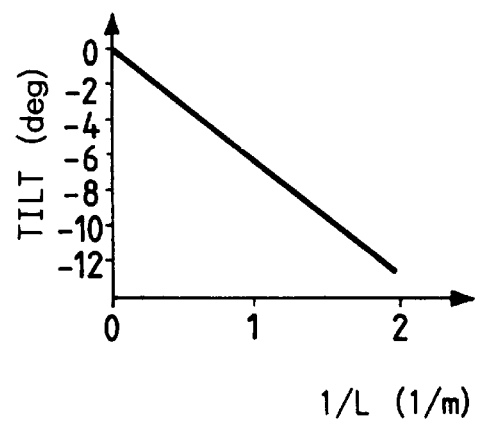
Figure 20A:
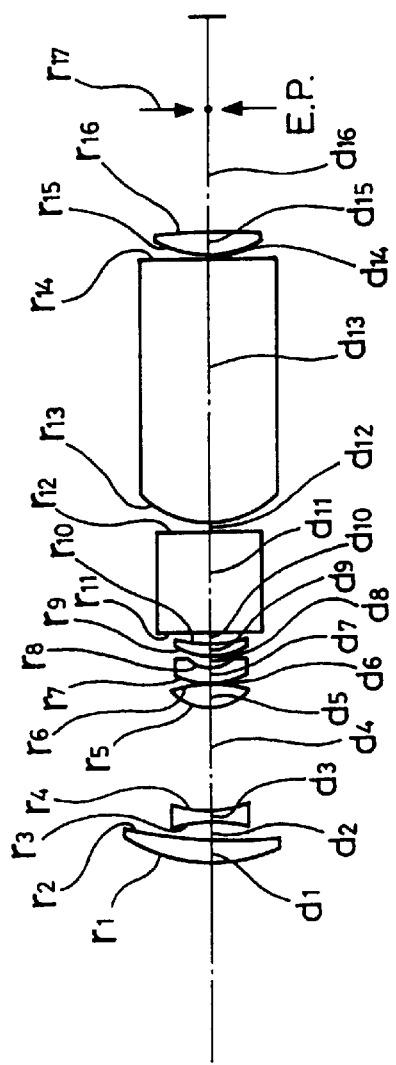
FIGS. 20A, 20B, and 20C are views showing arrangements developed along the optical axis of the finder optical system at wide-angle, middle, and telephoto positions, respectively, where an object distance is infinite in a third embodiment of the present invention.
Figure 20B:
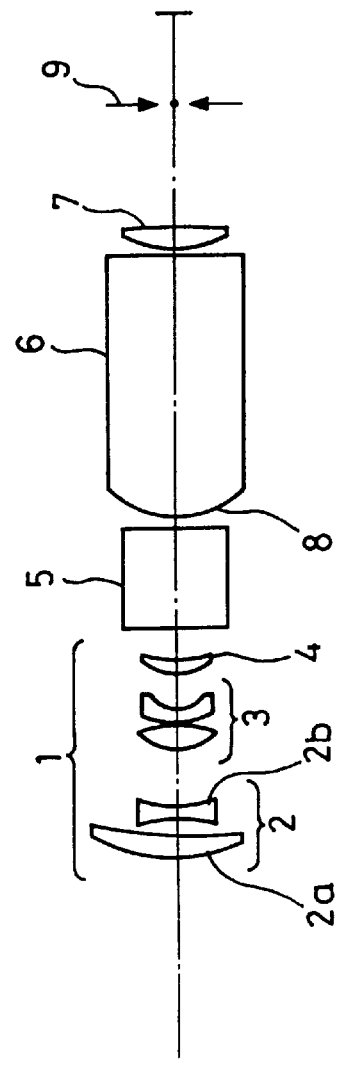
Figure 20C:
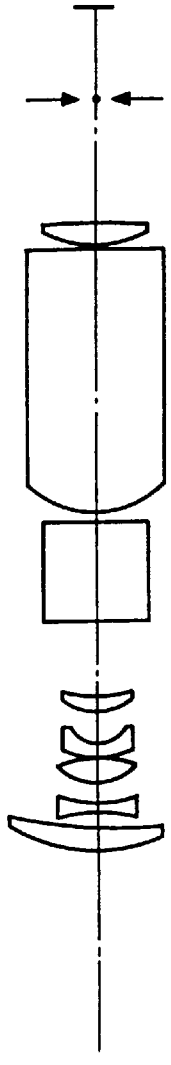
Figure 21A:
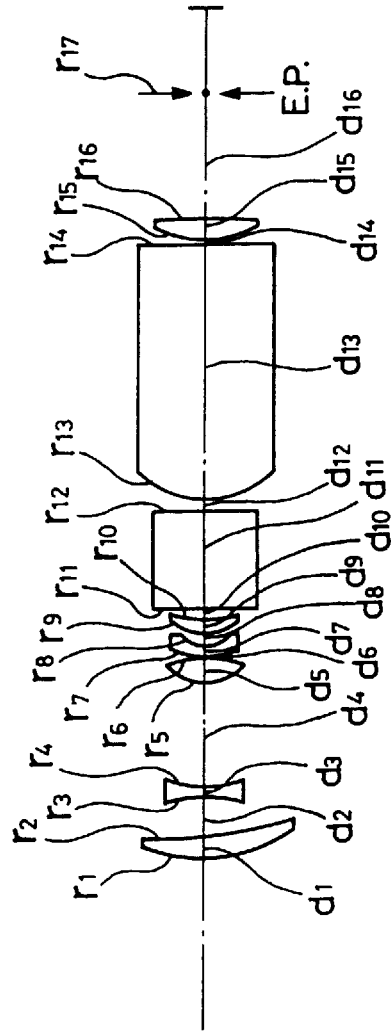
FIGS. 21A, 21B, and 21C are views showing arrangements developed along the optical axis of the finder optical system at wide-angle, middle, and telephoto positions, respectively, where an object distance is 0.6 m in the third embodiment.
Figure 21B:
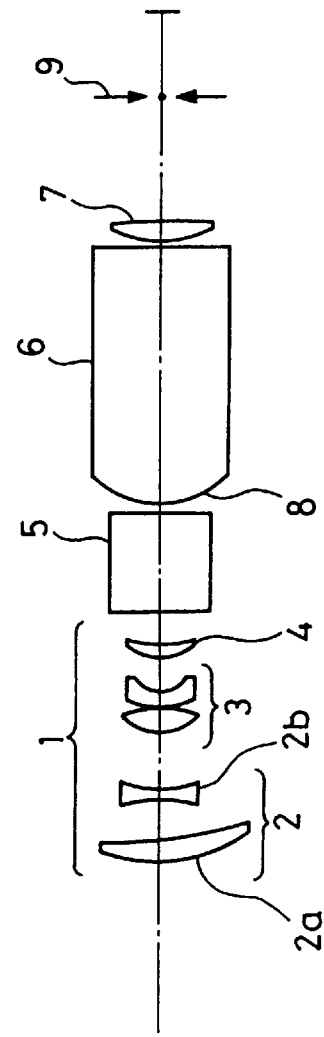
Figure 21C:
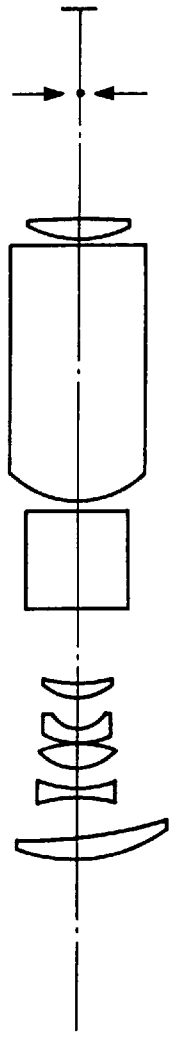

FIGS. 18A, 18B, and 18C are aberration curve diagrams showing the tilt of an imaging plane at wide-angle, middle, and telephoto positions, respectively, where the object distance is 0.6 m in the second embodiment;

FIGS. 19A, 19B, and 19C are graphs showing the relationships between the object distance and the lens movement in the second embodiment.

Third Embodiment

In the third embodiment, as shown in FIGS. 20A–20C and 21A–21C, the first lens unit 2 is divided into two lenses 2a and 2b of positive and negative so that corrections for diopter and parallax are made by the positive lens 2a which is lower in power. Although diopter correction is performed in the same way as the above embodiments, its shift direction is reverse. In this case, since the amount of shifting distance is 2.85 mm and the amount of shift is 3.5 mm, tolerance required for driving the correcting lens can be reduced. In this embodiment, in order to correct the inclination of the image plane in decentering, the correcting lens is tilted and in addition, the amount of decentering is divided, with a center at the object distance L=1.2 m. In this case, the center of rotation is apparently situated on the intermediate imaging plane side of the correcting lens so that it is rotated along the circular arc.

The lens data of the third embodiment are shown below. Symbols $D_1$ to $D_4$ denote variable spacings on the optical axis.

| | | | | | | | |
|---|---|---|---|---|---|---|---|
| r1 = | 19.415 | | | | | | |
| | | d1 = | 2.57 | n1 = | 1.7440 | v1 = | 44.7 |
| r2 = | 54.848 | | | | | | |
| | | d2 = | D1 | | | | |
| r3 = | −17.458 | | | | | | |
| | | d3 = | 1.0 | n3 = | 1.5842 | v3 = | 30.5 |
| r4 = | 10.432 (aspherical) | | | | | | |
| | | d4 = | D2 | | | | |
| r5 = | 4.972 (aspher1cai) | | | | | | |
| | | d5 = | 2.82 | n5 = | 1.4924 | v5 = | 57.7 |
| r6 = | −25.625 | | | | | | |
| | | d6 = | 0.2 | | | | |
| r7 = | 10.632 | | | | | | |
| | | d7 = | 1.6 | n7 = | 1.5842 | v7 = | 30.5 |
| r8 = | 4.176 | | | | | | |
| | | d8 = | D3 | | | | |
| r9 = | 6.171 (aspherical) | | | | | | |
| | | d9 = | 1.58 | n9 = | 1.4924 | v9 = | 57.7 |
| r10 = | 14.483 | | | | | | |
| | | d10 = | D4 | | | | |
| r11 = | ∞ | | | | | | |
| | | d11 = | 11.5 | n11 = | 1.4924 | v11 = | 57.7 |
| r12 = | ∞ | | | | | | |
| | | d12 = | 1.0 (field frame position) | | | | |
| r13 = | 14.483 | | | | | | |
| | | d13 = | 30.0 | n13 = | 1.4924 | v13 = | 57.7 |
| r14 = | ∞ | | | | | | |
| | | d14 = | 0.7 | | | | |
| r15 = | 11.845 (aspherical) | | | | | | |
| | | d15 = | 2.25 | n15 = | 1.4924 | v15 = | 57.7 |
| r16 = | −82.814 | | | | | | |
| | | d16 = | 15.0 | | | | |
| r17 = | (eyepoint) | | | | | | |

Aspherical coefficients

Fourth surface (r4)

K = 0
E = $-0.22218 \times 10^{-3}$, F = $-0.11793 \times 10^{-4}$,
G = $0.60251 \times 10^{-6}$ Fifth surface (r5)

K = 0
E = $-0.11170 \times 10^{-2}$, F = $0.89001 \times 10^{-5}$,
G = $-0.22201 \times 10^{-5}$ Ninth surface (r9)

K = 0
E = $-0.97256 \times 10^{-4}$, F = $-0.39153 \times 10^{-4}$,
G = $0.14898 \times 10^{-5}$ -continued Fifteenth surface (r15)

K = 0
E = $-0.12848 \times 10^{-3}$, F = $0.43360 \times 10^{-6}$,
G = $-0.85149 \times 10^{-8}$ Table 3 gives the data of the magnification, angle of view of incidence, variable spacing, shift, tilt, etc.

TABLE 3

| | Wide-angle position | Middle position | Telephoto position |
|---|---|---|---|
| Magnification | 0.50 | 0.75 | 1.13 |
| Angle of view (°) | 24.1 | 15.8 | 10.2 |
| L = ∞ | | | |
| D1 (mm) | 1.767 | 1.767 | 1.767 |
| Shift (mm) | 0.0 | 0.0 | 0.0 |
| Tilt (°) | −4.3 | −4.3 | −4.3 |
| L = 0.6 m | | | |
| D1 (mm) | 4.619 | 4.619 | 4.619 |
| Shift (mm) | −1.8 | −1.8 | −1.8 |
| Tilt (°) | 4.5 | 4.5 | 4.5 |
| Unit spacing | | | |
| D2 (mm) | 12.155 | 6.849 | 2.430 |
| D3 (mm) | 1.325 | 4.383 | 3.790 |
| D4 (mm) | 1.397 | 3.645 | 8.657 |

Figure 28:
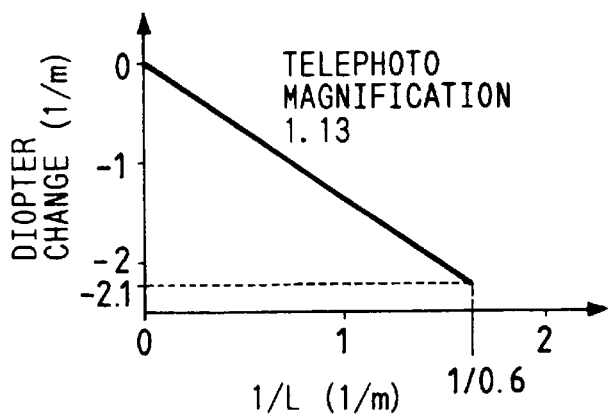
FIG. 28 is a graph showing a change of diopter in the third embodiment.

In the above embodiments, the finder magnifications are 0.5 at the wide-angle position, 0.75 at middle position, and 1.13 at the telephoto position. Since the most minimum object distance is 0.6 m, a diopter change of $(1/0.6) \times 1.13^2 = 2.1$ m$^{-1}$ is produced at the telephoto position (see FIG. 28). Further, since the optical axes of the photographic system and the finder system are disposed 50 mm apart, it follows that the maximum parallax of $\tan^{-1} (50/600) = 4.8°$ is generated (see FIG. 2). Also, the shift toward the photographing optical system is taken as a negative (−). For the tilt, a lens rotates, with a center at the vertex of the surface directed to the object, and in the arrangements of the optical systems developed along the optical axis (FIGS. 14A–14C and 21A–21C), a clockwise direction is taken as a negative (−)

Figure 22A:
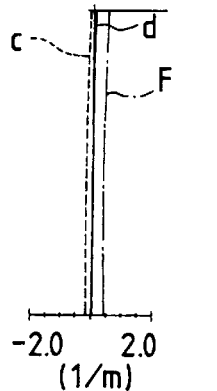
FIGS. 22A, 22B, and 22C are diagrams showing aberration curves at the wide-angle position where the object distance is 1.2 m and no lens unit is decentered in the third embodiment.
Figure 22B:
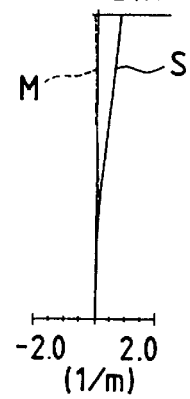
Figure 22C:
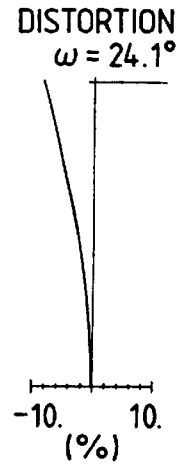

FIGS. 22A, 22B, and 22C are diagrams showing aberration curves at the wide-angle position where the object distance is 1.2 m and no lens unit is decentered in the third embodiment.

Figure 23A:
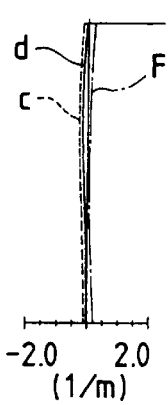
FIGS. 23A, 23B, and 23C are diagrams showing aberration curves at the middle position where the object distance is 1.2 m and no lens unit is decentered in the third embodiment.
Figure 23B:
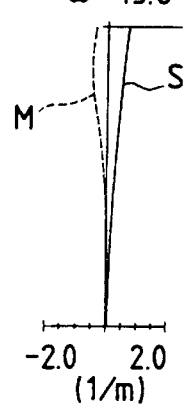
Figure 23C:

FIGS. 23A, 23B, and 23C are diagrams showing aberration curves at the middle position where the object distance is 1.2 m and no lens unit is decentered in the third embodiment.

Figure 24A:
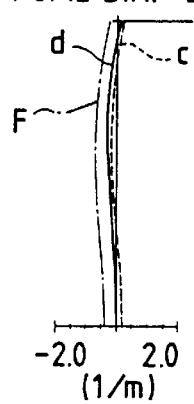
FIGS. 24A, 24B, and 24C are diagrams showing aberration curves at the telephoto position where the object distance is 1.2 m and no lens unit is decentered in the third embodiment.
Figure 24B:
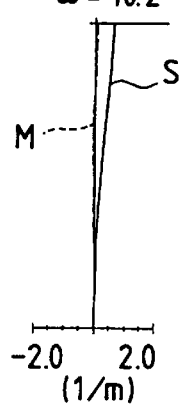
Figure 24C:
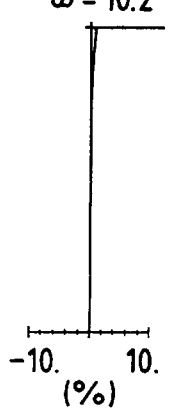

FIGS. 24A, 24B, and 24C are diagrams showing aberration curves at the telephoto position where the object distance is 1.2 m and no lens unit is decentered in the third embodiment.

Figure 25A:
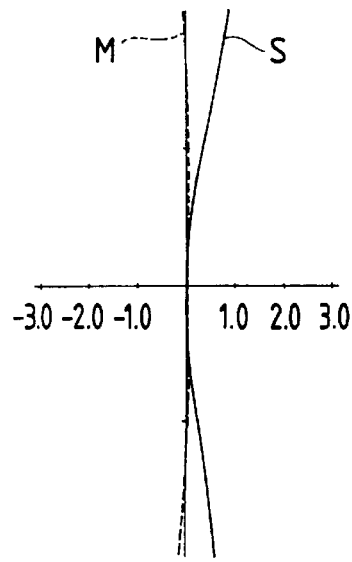
FIGS. 25A, 25B, and 25C are aberration curve diagrams showing the tilt of an imaging plane at wide-angle, middle, and telephoto positions, respectively, where the object distance is infinite in the third embodiment.
Figure 25B:
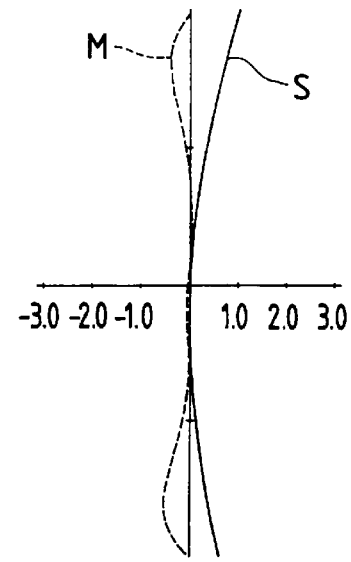
Figure 25C:
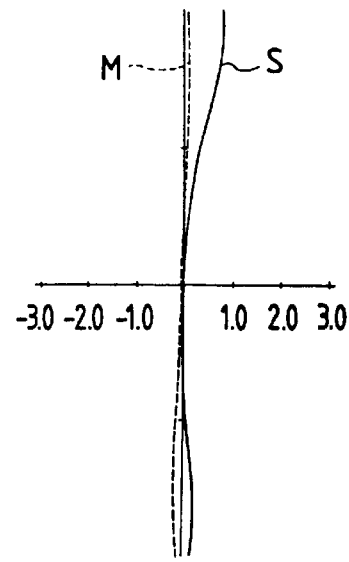

FIGS. 25A, 25B, and 25C are aberration curve diagrams showing the tile of an imaging plane at wide-angle, middle, and telephoto positions, respectively, where the object distance is infinite in the third embodiment.

Figure 26A:
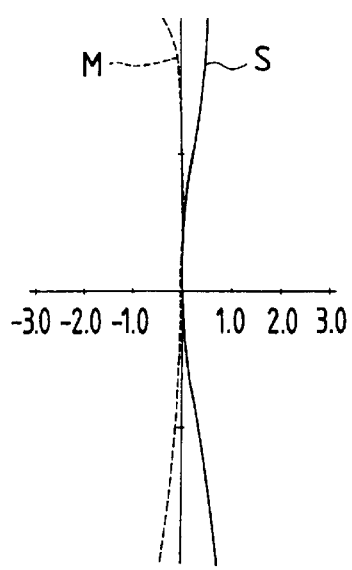
FIGS. 26A, 26B, and 26C are aberration curve diagrams showing the tilt of an imaging plane at wide-angle, middle, and telephoto positions, respectively, where the object distance is 0.6 m in the third embodiment.
Figure 26B:
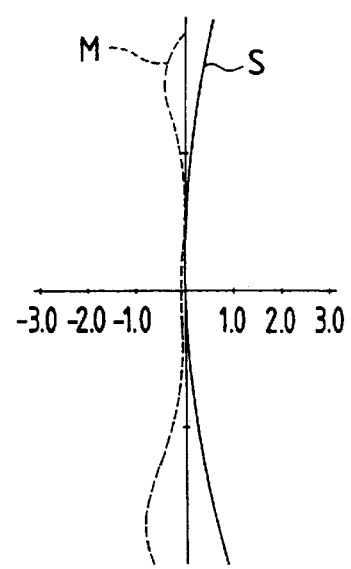
Figure 26C:
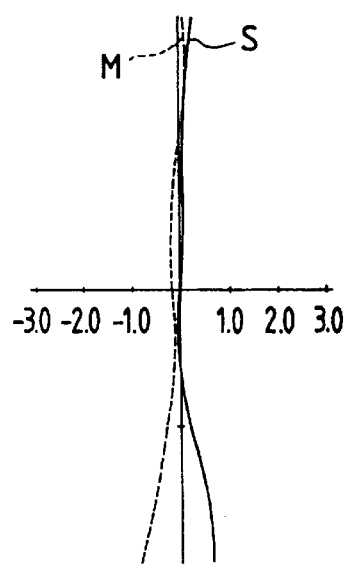

FIGS. 26A, 26B, and 26C are aberration curve diagrams showing the tilt of an imaging plane at wide-angle, middle, and telephoto positions, respectively, where the object distance is 0.6 m in the third embodiment.

Figure 27A:
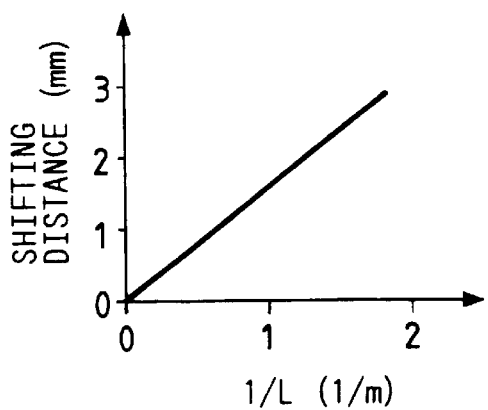
FIGS. 27A, 27B, and 27C are graphs showing the relationships between the object distance and the lens movement in the third embodiment.
Figure 27B:
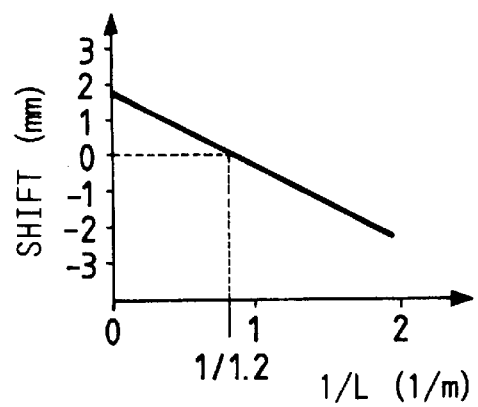
Figure 27C:
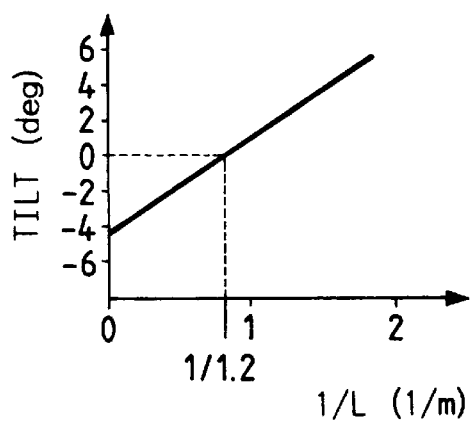

FIGS. 27A, 27B, and 27C are graphs showing the relationships between the object distance and the lens movement in the third embodiment.

Fourth Embodiment

Figure 29A:
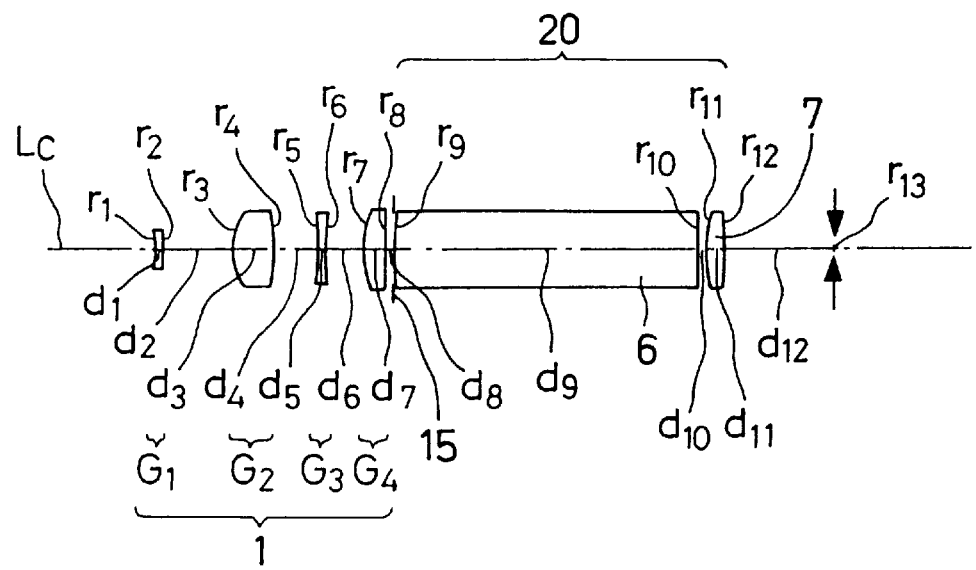
FIGS. 29A and 29B are views showing arrangements developed along the optical axis of the finder optical system at wide-angle and telephoto positions, respectivefly, in a fourth embodiment of the present invention.
Figure 29B:
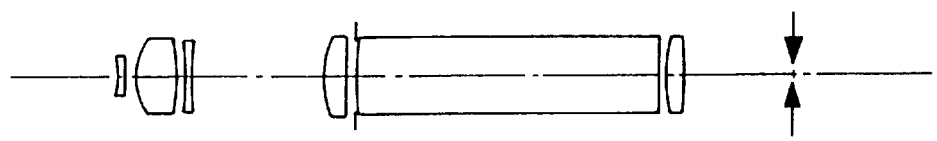

FIGS. 29A and 29B show the finder optical system having the function of correction relative to this embodiment. In these figures, the optical system of the fourth embodiment includes the objective system 1 with a positive refracting power, an eyepiece system 20 composed of a fourfold-reflecting prism 6 and a positive lens 7, and a field frame (an intermediate imaging plane) 15 interposed between the objective system 1 and the eyepiece system 20. The objective system 1 is constructed as a zoom lens consisting of four lens units of negative ($G_1$), positive ($G_2$), negative ($G_3$), and positive ($G_4$), so that any lens unit can be moved along an optical axis $L_C$ to correct diopter. Correction for parallax can be made by decentering one of the lens units constituting the objective system 1.

The numerical data of the finder optical system in the fourth embodiment are as follows:

| | | | | | | | |
|---|---|---|---|---|---|---|---|
| r1 = | −16.4440 (aspherical) | | | | | | |
| | | d1 = | 1.000 | | n1 = 1.58362 | v1 = | 30.37 |
| r2 = | 128.2560 | | | | | | |
| | | d2 = | 9.1300 (low magnification), | | | | |
| | | | 1.679 (high magnification) | | | | |
| r3 = | 7.6560 | | | | | | |
| | | d3 = | 5.220 | | n3 = 1.49260 | v3 = | 58.02 |
| r4 = | −13.800 (aspherical) | | | | | | |
| | | d4 = | 5.6710 (low magnification), | | | | |
| | | | 1.049 (high magnification) | | | | |
| r5 = | −36.5900 | | | | | | |
| | | d5 = | 1.000 | | n5 = 1.58362 | v5 = | 30.37 |
| r6 = | 71.2090 (aspherical) | | | | | | |
| | | d6 = | 5.0910 (low magnification), | | | | |
| | | | 17.164 (high magnification) | | | | |
| r7 = | 13.6360 | | | | | | |
| | | d7 = | 2.900 | | n7 = 1.49260 | v7 = | 58.02 |
| r8 = | ∞ | | | | | | |
| | | d8 = | 1.000 | | | | |
| r9 = | 33.4050 | | | | | | |
| | | d9 = | 39.500 | | n9 = 1.49260 | v9 = | 58.02 |
| r10 = | ∞ | | | | | | |
| | | d10 = | 1.000 | | | | |
| r11 = | 17.5090 | | | | | | |
| | | d11 = | 2.500 | | n11 = 1.49260 | v10 = | 58.02 |
| r12 = | −64.3960 (aspherical) | | | | | | |
| | | d12 = | 13.500 | | | | |
| r13 = | (eyepoint) | | | | | | |

Aspherical coefficients

First surface (r1)

K = 0
E = $0.30788 \times 10^{-4}$, F = $-0.40427 \times 10^{-4}$,
G = $0.62311 \times 10^{-5}$ Fourth surface (r4)

K = 0
E = $0.65521 \times 10^{-3}$, F = $0.58398 \times 10^{-5}$,
G = $0.10530 \times 10^{-6}$ Sixth surface (r6)

K = 0
E = $0.86696 \times 10^{-5}$, F = $-0.19119 \times 10^{-6}$,
G = $0.35113 \times 10^{-6}$ -continued Twelfth surface (r12)

Figure 30A:
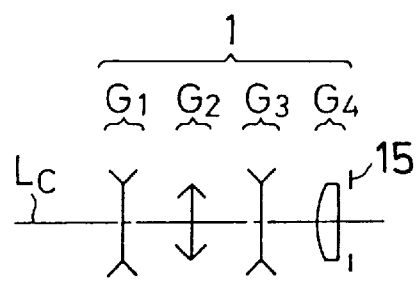
FIGS. 30A and 30B are explanatory views showing correction for parallax, based on the decentering of the objective system, in ordinary and after-correction states, respectively, in the fourth embodiment.
Figure 30B:
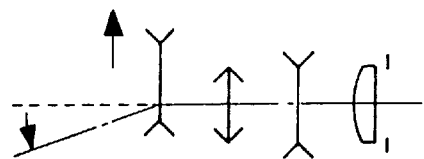

K = 0
E = $0.49100 \times 10^{-4}$, F = $-0.17743 \times 10^{-5}$,
G = $0.42481 \times 10^{-7}$ In accordance with FIGS. 30A and 30B, correction for parallax in the fourth embodiment is explained. In this embodiment, parallax is corrected by decentering a part of lenses constituting the objective system of the finder optical system. Specifically, the first unit $G_1$ of negative which is a component of the objective system 1 is moved in a direction perpendicular to the optical axis $L_C$ (in the direction of an arrow). Whereby, the optical axis $L_C$ is inclined in an opposite direction with respect to the movement of the first unit $G_1$, and correction for parallax is thus made.

Figure 31A:
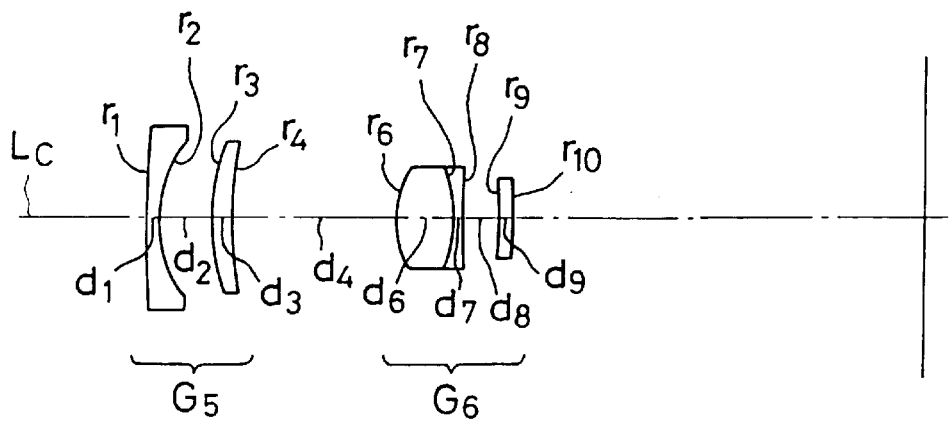
FIGS. 31A and 31B are views showing arrangements developed along the optical axis of the photographing optical system at wide-angle and telephoto positions, respectively, in the fourth embodiment.
Figure 31B:
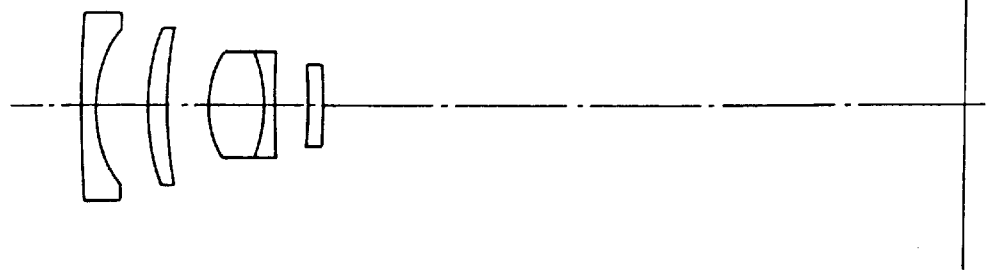

Next, reference is made to correction for diopter. The photographing optical system of a camera in the fourth embodiment, as shown in FIGS. 31A and 31B, employs a zoom lens composed of a first unit $G_5$ of negative and a second unit $G_6$ of positive. In this photographing optical system, when focusing is performed by the shift of the first unit $G_5$, the angle of view widens from the infinite distance to the minimum distance.

The numerical data of the photographing optical system used in the fourth embodiment are shown below.

| | | | | | | | |
|---|---|---|---|---|---|---|---|
| r1 = | 215.0200 | | | | | | |
| | | d1 = | 1.830 | | n1 = 1.80400 | v1 = | 46.57 |
| r2 = | 17.1590 (aspherical) | | | | | | |
| | | d2 = | 6.7700 | | | | |
| r3 = | 27.0920 | | | | | | |
| | | d3 = | 3.000 | | n3 = 1.76182 | v3 = | 26.52 |
| r4 = | 58.3920 | | | | | | |
| | | d4 = | 20.917 (low magnification), | | | | |
| | | | 4.148 (high magnification) | | | | |
| r5 = | ∞ (stop) | | | | | | |
| | | d5 = | 1.000 | | | | |
| r6 = | 13.4650 (aspherical) | | | | | | |
| | | d6 = | 7.520 | | n6 = 1.56873 | v6 = | 63.16 |
| r7 = | −17.6940 | | | | | | |
| | | d7 = | 1.500 | | n7 = 1.63636 | v7 = | 35.37 |
| r8 = | 114.7790 | | | | | | |
| | | d8 = | 4.710 | | | | |
| r9 = | −45.6040 (aspherical) | | | | | | |
| | | d9 = | 1.880 | | n9 = 1.77250 | v9 = | 49.66 |
| r10 = | −127.6830 | | | | | | |
| | | d10 = | 0.000 | | | | |

Aspherical coefficients

Second surface (r2)

K = 0
E = $-0.19169 \times 10^{-4}$, F = $-0.12866 \times 10^{-7}$,
G = $-0.52470 \times 10^{-9}$ Sixth surface (r6)

K = −0.0540
E = $0.57898 \times 10^{-5}$, F = $0.10384 \times 10^{-6}$,
G = $0.49381 \times 10^{-9}$, H = $0.80171 \times 10^{-11}$, Ninth surface (r9)

K = 0.6587
E = $-0.91883 \times 10^{-4}$, F = $-0.44647 \times 10^{-6}$,
G = $-0.14988 \times 10^{-7}$ Where the diopter of the finder is corrected to the focusing of the photographing optical system, the first unit $G_1$ or the fourth unit $G_4$ of the finder optical system is moved along the optical axis $L_C$, thereby diminishing the finder magnification. Consequently, the change of the field factor can be held to a minimum.

Tables 4 and 5 show the values of the angle of view of the photographing optical system in this case, the finder magnification, and Eqs. (3) and (4).

TABLE 4

| Angle of view of photographing optical system | low magnification | high magnification |
|---|---|---|
| Infinity | 28.04 | 15.39 |
| 0.6 m | 29.27 | 16.27 |

TABLE 5

| | Movement of the first unit (G1) | | Movement of the fourth unit (G4) | |
|---|---|---|---|---|
| Finder magnification | low magnification | high magnification | low magnification | high magnification |
| Infinity | 0.417 | 0.736 | 0.417 | 0.736 |
| 0.6 m | 0.402 | 0.705 | 0.404 | 0.682 |
| Eq. (3) | 0.84 | 0.84 | 0.83 | 0.86 |
| Eq. (4) | 0.99 | 0.98 | 0.98 | 1.02 |

The focusing of the photographing optical system may well be performed by shifting the whole of the first and second units $G_5$ and $G_6$. In this case, the angle of view of the photographing optical system narrows over the range from the infinite distance to the minimum distance.

Thus, when the second unit $G_2$ of the finder optical system of the fourth embodiment is moved along the optical axis $L_C$ for correction for diopter, the finder magnification will increase and as a result, the change of the field factor can be held to a minimum.

Tables 6 and 7 show the values of the angle of view of the photographing optical system in this case, the finder magnification, and Eqs. (3) and (4).

TABLE 6

| Angle of view of photographing optical system | low magnification | high magnification |
|---|---|---|
| Infinity | 28.04 | 15.39 |
| 0.6 m | 26.73 | 13.47 |

TABLE 7

| | Movement of the second unit (G2) | |
|---|---|---|
| Finder magnification | low magnification | high magnification |
| Infinity | 0.417 | 0.736 |
| 0.6 m | 0.423 | 0.783 |
| Eq. (3) | 0.92 | 0.92 |
| Eq. (4) | 1.04 | 1.08 |

Fifth Embodiment

Figure 32A:
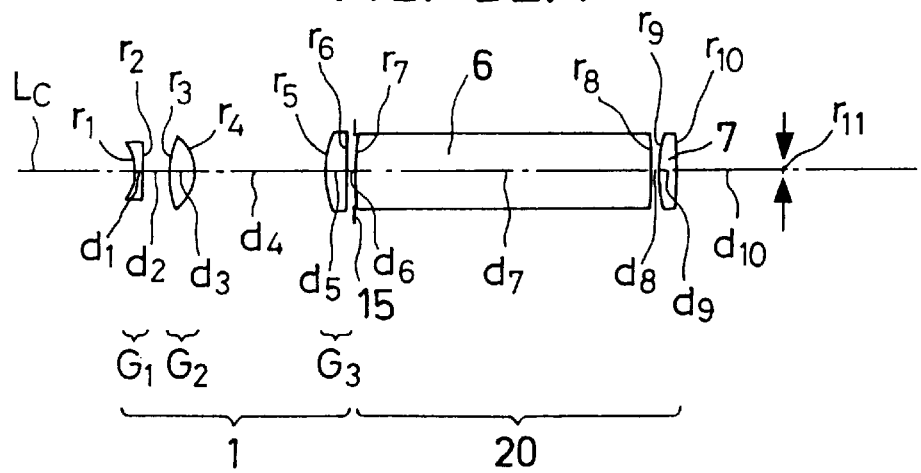
FIGS. 32A and 32B are views showing arrangements developed along the optical axis of the finder optical system at wide-angle and telephoto positions, respectively, in a fifth embodiment of the present invention.
Figure 32B:
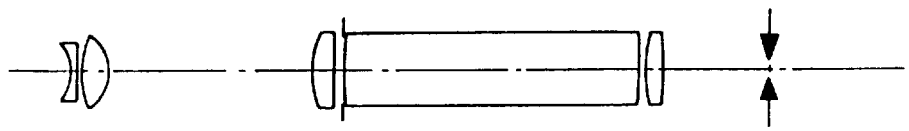

FIGS. 32A and 32B show the finder optical system of this embodiment. In these figures, the optical system of the fifth embodiment includes the objective system 1 having a positive refracting power, the eyepiece 20 composed of a fourfold-reflecting prism 6 and a positive lens 7, and the field frame 15 disposed between the objective system 1 and the eyepiece 20. The objective system 1 is constructed as a zoom lens consisting of three lens units of negative ($G_1$), positive ($G_2$), and positive ($G_3$), so that any lens unit can be moved along the optical axis $L_C$ to correct diopter. Correction for parallax can be made by decentering one of the lens units constituting the objective system 1.

The numerical data of the finder optical system in the fifth embodiment are as follows:

$r_1 = -5.474$ (aspherical)
  $d_1 = 1.0$    $n_1 = 1.5842$    $v_1 = 30.5$
$r_2 = -469.147$
  $d_2 = 3.714$ (low magnification),
       $0.950$ (high magnification)
$r_3 = 18.744$
  $d_3 = 3.0$    $n_3 = 1.4924$    $v_3 = 57.7$
$r_4 = -5.592$ (aspherical)
  $d_4 = 17.100$ (low magnification),
       $27.250$ (high magnification)
$r_5 = 14.255$
  $d_5 = 3.0$    $n_5 = 1.4924$    $v_5 = 57.7$
$r_6 = \infty$
  $d_6 = 2.0$
$r_7 = \infty$
  $d_7 = 39.5$   $n_7 = 1.4924$    $v_7 = 57.7$
$r_8 = -60.000$
  $d_8 = 1.0$
$r_9 = 24.248$ (aspherical)
  $d_9 = 2.5$    $n_9 = 1.4924$    $v_9 = 57.7$
$r_{10} = -63.120$
  $d_{10} = 13.5$
$r_{11} = $ (eyepoint)
Aspherical coefficients First surface ($r_1$)

$K = 0$
$E = -0.43262 \times 10^{-3}, F = -0.74538 \times 10^{-4},$
$G = 0.12197 \times 10^{-4}$ Fourth surface ($r_4$)

$K = 0$
$E = 0.45952 \times 10^{-3}, F = 0.69408 \times 10^{-5},$
$G = 0.94103 \times 10^{-6}$ Ninth surface ($r_9$)

$K = 0$
$E = 0.57843 \times 10^{-4}, F = -0.47032 \times 10^{-5},$
$G = 0.79080 \times 10^{-7}$ In the fifth embodiment, focusing is performed by the photographing optical system of the camera used in the fourth embodiment. When focusing is made by shifting the first unit $G_5$ of the photographing optical system, the angle of view widens from the infinite distance to the minimum distance. Thus, where the diopter of the finder is corrected at the same time as the focusing of the photographing optical system, the second unit $G_2$ of the finder optical system is moved along the optical axis $L_C$, thereby diminishing the finder magnification. Consequently, the change of the field factor can be held to a minimum.

Tables 8 and 9 show the values of the angle of view of the photographing optical system in this case, the finder magnification, and Eqs. (3) and (4).

TABLE 8

| Angle of view of photographing optical system | low magnification | high magnification |
|---|---|---|
| Infinity | 28.04 | 15.39 |
| 0.6 m | 26.27 | 16.27 |

TABLE 9

| | Movement of the second unit (G2) | |
|---|---|---|
| Finder magnification | low magnification | high magnification |
| Infinity | 0.420 | 0.745 |
| 0.6 m | 0.405 | 0.730 |
| Eq. (3) | 0.84 | 0.82 |
| Eq. (4) | 0.99 | 0.96 |

Sixth Embodiment

FIGS. 33A and 33B show the finder optical system of this embodiment. In these figures, the optical system of the sixth embodiment includes the objective system 1 composed of a once-reflecting prism, having a positive refracting power, the eyepiece system 20 composed of the thrice-reflecting prism 6 and a positive lens 7, and the field frame 15 interposed between the objective system 1 and the eyepiece system 20. The objective system 1 is constructed as a zoom lens consisting of four lens units of negative ($G_1$), positive ($G_2$), positive ($G_3$), and positive ($G_4$), so that one of the first ($G_1$) to third ($G_3$) lens units can be moved along an optical axis $L_C$ to correct diopter. Correction for parallax can be made by decentering one of the lens units constituting the objective system 1.

The numerical data of the finder optical system in the sixth embodiment are as follows:

$r_1 = 427.621$
  $d_1 = 1.0$  $n_1 = 1.5842$  $v_1 = 30.5$
$r_2 = 21.907$ (aspherical)
  $d_2 = 4.83$
$r_3 = -26.983$
  $d_3 = 1.0$  $n_3 = 1.5842$  $v_3 = 30.5$ -continued $r_4 = 97.412$
  $d_4 = 13.381$ (low magnification),
     3.795 (high magnification)
$r_5 = 5.250$ (aspherical)
  $d_5 = 3.7$  $n_5 = 1.4924$  $v_5 = 57.7$
$r_6 = -25.997$
  $d_6 = 0.2$
$r_7 = 11.548$
  $d_7 = 2.41$  $n_7 = 1.5842$  $v_7 = 30.5$
$r_8 = 3.900$
  $d_8 = 1.500$ (low magnification),
     6.181 (high magnification)
$r_9 = 9.536$ (aspherical)
  $d_9 = 1.75$  $n_9 = 1.4924$  $v_9 = 57.7$
$r_{10} = 108.900$
  $d_{10} = 1.000$ (low magnification),
     5.906 (high magnification)
$r_{11} = \infty$
  $d_{11} = 12.0$  $n_{11} = 1.4924$  $v_{11} = 57.7$
$r_{12} = -11.590$
  $d_{12} = 0.7$
$r_{13} = \infty$
  $d_{13} = 29.0$  $n_{13} = 1.4924$  $v_{13} = 57.7$
$r_{14} = \infty$
  $d_{14} = 0.7$
$r_{15} = 17.326$ (aspherical)
  $d_{15} = 2.3$  $n_{15} = 1.4924$  $v_{15} = 57.7$
$r_{16} = -24.527$
  $d_{16} = 15.0$
$r_{17} = $ (eyepoint)
Aspherical coefficients Second surface ($r_2$)

$K = 0$
$E = 0.11783 \times 10^{-3}$, $F = -0.11803 \times 10^{-4}$,
$G = 0.20704 \times 10^{-6}$ Fifth surface ($r_5$)

$K = 0$
$E = -0.86055 \times 10^{-3}$, $F = -0.51448 \times 10^{-5}$,
$G = -0.10653 \times 10^{-5}$ Ninth surface ($r_9$)

$K = 0$
$E = 0.39471 \times 10^{-3}$, $F = -0.36821 \times 10^{-4}$,
$G = 0.14630 \times 10^{-5}$ Fifteenth surface ($r_{15}$)

$K = 0$
$E = -0.11542 \times 10^{-3}$, $F = 0.34242 \times 10^{-5}$,
$G = -0.69852 \times 10^{-7}$ In the sixth embodiment, focusing is performed by the photographing optical system of the camera used in the fourth embodiment. When focusing is made by shifting the first unit $G_5$ of the photographing optical system, the angle of view widens from the infinite distance to the minimum distance. Thus, where the diopter of the finder is corrected at the same time as the focusing of the photographing optical system, the first unit $G_1$ of the finder optical system is moved along the optical axis $L_C$, thereby diminishing the finder magnification. Consequently, the change of the field factor can be held to a minimum.

Tables 10 and 11 show the values of the angle of view of the photographing optical system in this case, the finder magnification, and Eqs. (3) and (4).

TABLE 10

| Angle of view of photographing optical system | low magnification | high magnification |
|---|---|---|
| Infinity | 28.04 | 15.39 |
| 0.6 m | 29.27 | 16.27 |

TABLE 11

| Finder magnification | Movement of the second unit (G2) | |
| | low magnification | high magnification |
|---|---|---|
| Infinity | 0.443 | 0.860 |
| 0.6 m | 0.423 | 0.822 |
| Eq. (3) | 0.83 | 0.84 |
| Eq. (4) | 1.00 | 0.99 |

Seventh Embodiment

In accordance with FIGS. 34A and 34B, the method of correcting parallax of the optical system according to this embodiment is explained. Correction for parallax in the seventh embodiment is made by the movement of the field frame. In this case, the field frame 15 is designed so as to be capable of sliding and moving in a direction (of an arrow) perpendicular to the optical axis $L_C$ (perpendicular to the plane of the figure) by inserting positioning pins 16a and 16b in slots 15a and 15b provided on the field frame itself. Thus, the position of the field range of the finder can be shifted to correct parallax.

Also, in the seventh embodiment, the arrangement and the method of correcting diopter of the finder optical system and the arrangement of the photographing optical system are identical with those shown in the fourth to sixth embodiments.

Eighth Embodiment

Based on FIGS. 35A and 35B, the method of correcting parallax of the optical system according to this embodiment is explained. Correction for parallax in the eighth embodiment is made by changing the indication of the field range. The field frame 15 has a double structure of a plate section 15c (outside) and a liquid crystal section 15d (inside), which is composed of a lower liquid crystal section $15d_1$ and an upper liquid crystal section $15d_2$. By switching the displays of the lower liquid crystal section $15d_1$ and the upper liquid crystal section $15d_2$, the indication of the field range can be changed. Specifically, by changing from an ordinary state where the lower liquid crystal section $15d_1$ is taken as a light-blocking part and the upper liquid crystal section $15d_2$ as a transmissive part to a reverse state, the same effect as in the fifth embodiment is brought about.

Also, in the eighth embodiment, the arrangement and the method of correcting diopter of the finder optical system and the arrangement of the photographing optical system are identical with those shown in the fourth to sixth embodiments.

Ninth Embodiment

Figure 36A:
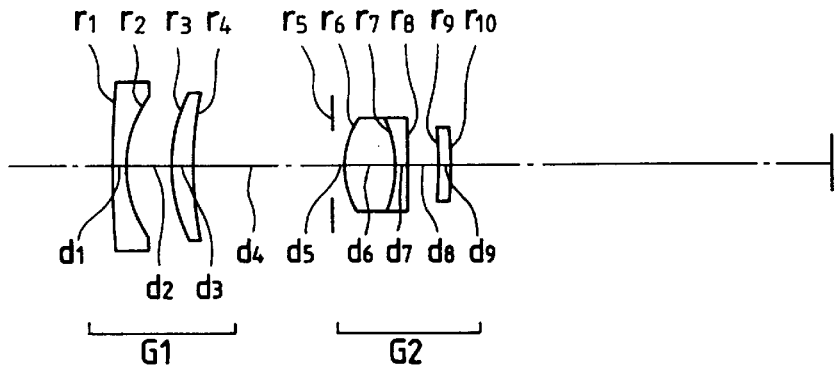
FIGS. 36A and 36B are developed views showing arrangements of the photographing optical system at wide-angle and telephoto positions, respectively, in a ninth embodiment of the present invention.
Figure 36B:
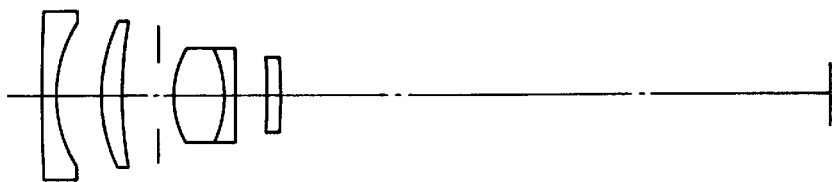

This embodiment is such that the photographing optical system, as depicted in FIGS. 36A and 36B, is constructed as a two-component zoom lens composed of the first unit $G_1$ of a negative refracting power and the second unit $G_2$ of a positive refracting power. The first unit $G_1$ is shifted to perform focusing, by which the angle of view is increased over the range from the infinite distance to the minimum distance.

On the other hand, the finder, as shown in FIGS. 37A–37D, is constructed with the objective system 1 having a positive refracting power, a field lens 25, and the eyepiece system 20 composed of the fourfold-reflecting prism 6 and the positive lens 7. The objective system 1 of the finder comprises the first unit $G_1$ including two lenses, with a negative refracting power as a whole, and the second unit $G_2$ with a positive refracting power, so that the first unit $G_1$ and the second unit $G_2$ move when magnification is changed. The field frame 15 for defining the field range is disposed adjacent to the plane of incidence of the prism of the eyepiece system 20.

Figure 37A:
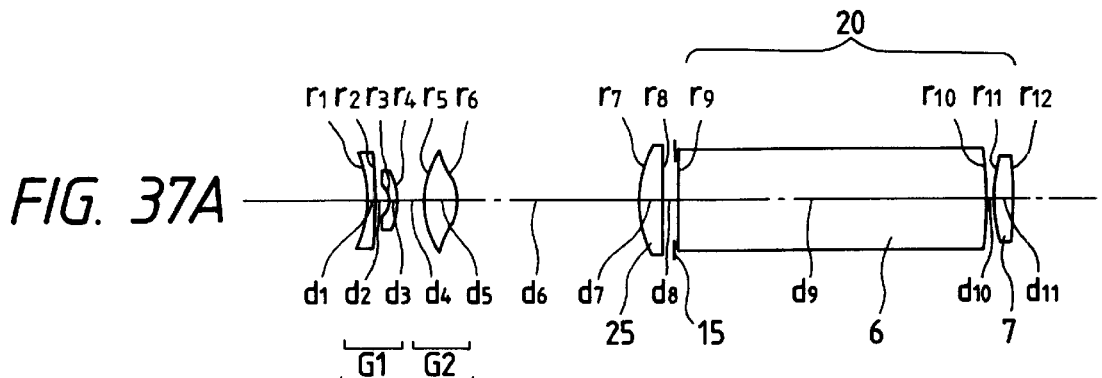
FIGS. 37A, 37B, 37C, and 37D are developed views showing arrangements of the finder optical system at the wide-angle position for an infinite object point, telephoto position for an infinite object point, wide-angle position for object point 1 m, and telephoto position for object point 1 m, respectively, in the ninth embodiment.
Figure 37B:
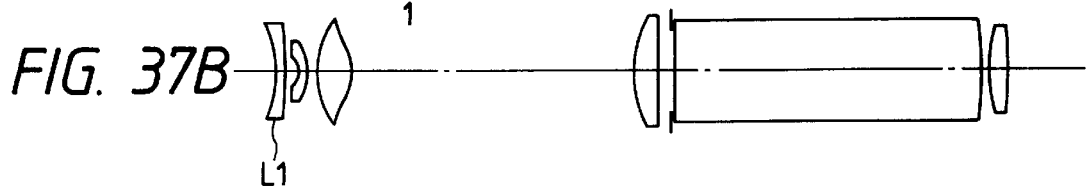
Figure 37C:
Figure 37D:
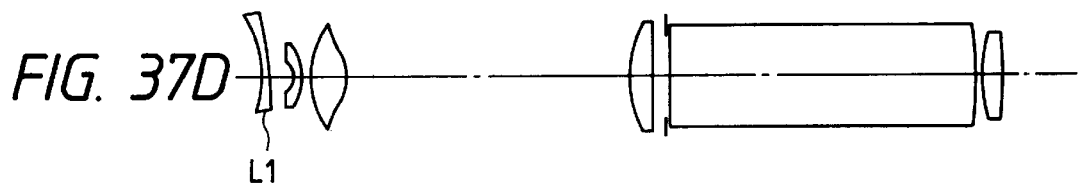
Figure 39A:
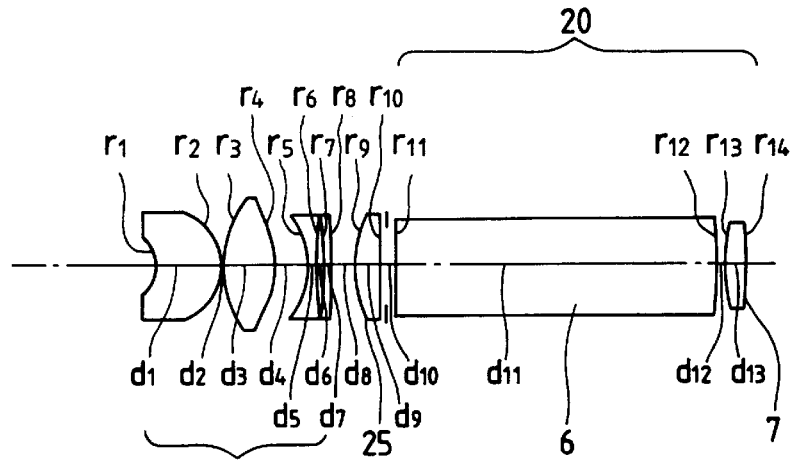
FIGS. 39A, 39B, 39C, and 39D are developed views showing arrangements of the finder optical system at the wide-angle position for an infinite object point, telephoto position for an infinite object point, wide-angle position for object point 1 m, and telephoto position for object point 1 m, respectively, in the tenth embodiment.
Figure 39B:
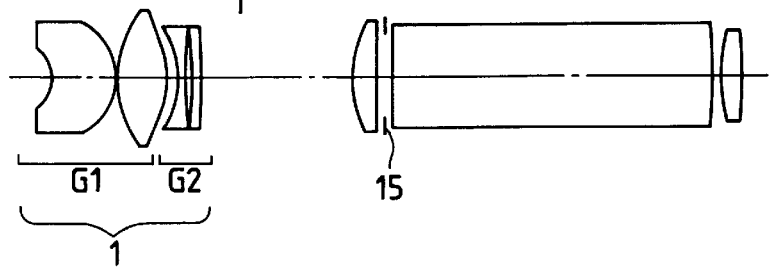
Figure 39C:
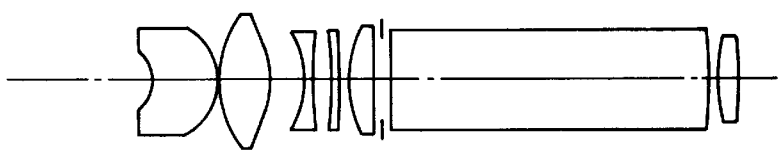
Figure 39D:
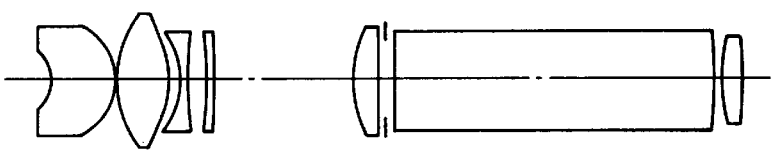

In the ninth embodiment, to coincide with the change of the angle of view of the photographic lens caused by focusing, a part of lenses constituting the first unit $G_1$ of the finder objective system, namely a first lens $L_1$ located on the object side, is moved along the optical axis to thereby correct diopter. Further, the first lens $L_1$ of the first unit, as shown in FIGS. 37C and 37D, is decentered and moved for parallax correction. The movements of these lenses are calculated by the object distance data from the focus detectors.

The numerical data of the photographic lens and the finder in the ninth embodiment are as follows: Photographic lens Photographic lens $r_1 = 215.020$
            $d_1 = 1.83$          $n_1 = 1.80400$      $v_1 = 46.57$
$r_2 = 17.159$ (aspherical)
            $d_2 = 6.77$
$r_3 = 27.092$
            $d_3 = 3.00$          $n_3 = 1.76182$      $v_3 = 26.52$
$r_4 = 58.392$
            $d_4 = D_1$ (variable)
$r_5 = $ (stop)
            $d_5 = 1.00$
$r_6 = 13.465$ (aspherical)
            $d_6 = 7.52$          $n_6 = 1.56873$      $v_6 = 63.16$
$r_7 = -17.694$
            $d_7 = 1.50$          $n_7 = 1.63636$      $v_7 = 35.37$
$r_8 = 114.779$
            $d_8 = 4.71$
$r_9 = -45.604$ (aspherical)
            $d_9 = 1.88$          $n_9 = 1.77250$      $v_9 = 49.66$
$r_{10} = -127.683$
Aspherical coefficients Second surface ($r_2$)

$K = 0.2761$
$E = -1.9169 \times 10^{-5}$, $F = -1.2866 \times 10^{-8}$,
$G = -5.2470 \times 10^{-10}$, $H = 0$
Sixth surface ($r_6$)

$K = 0.054$
$E = 5.7808 \times 10^{-6}$, $F = 1.0384 \times 10^{-7}$,
$G = 4.9381 \times 10^{-10}$, $H = 8.0171 \times 10^{-12}$
Ninth surface ($r_9$)

$K = 0.6587$
$E = -9.1883 \times 10^{-5}$, $F = -4.4647 \times 10^{-7}$,
$G = -1.4988 \times 10^{-8}$, $H = 0$ -continued

|  | W ∞ | W 1m | T ∞ | T 1m |
|---|---|---|---|---|
| $D_1$ | 20.917 | 22.630 | 6.229 | 7.942 (mm) |
| $\omega$ | 28.04 | 28.67 | 17.00 | 17.40 (°) |

Finder $r_1 = -16.112$
  $d_1 = 1.00$  $n_1 = 1.58423$  $\nu_1 = 30.49$
$r_2 = -87.208$
  $d_2 = D_1$ (variable)
$r_3 = -3.017$ (aspherical)
  $d_3 = 1.00$  $n_3 = 1.58423$  $\nu_3 = 30.49$
$r_4 = -7.221$
  $d_4 = D_2$ (variable)
$r_5 = 11.781$
  $d_5 = 4.71$  $n_5 = 1.49241$  $\nu_5 = 57.66$
$r_6 = -6.717$ (aspherical)
  $d_6 = D_3$ (variable)
$r_7 = 16.469$
  $d_7 = 3.00$  $n_7 = 1.49241$  $\nu_7 = 57.66$
$r_8 = \infty$
  $d_8 = 2.00$
$r_9 = \infty$
  $d_9 = 39.50$  $n_9 = 1.49241$  $\nu_9 = 57.66$
$r_{10} = -60.000$
  $d_{10} = 1.00$
$r_{11} = 24.248$ (aspherical)
  $d_{11} = 2.50$  $n_{11} = 1.49241$  $\nu_{11} = 57.66$
$r_{12} = -63.120$
  $d_{12} = 13.50$
$r_{13} =$ (eyepoint)
Aspherical coefficients Third surface ($r_3$)

$K = 0$
$E = 2.4368 \times 10^{-3}, F = -6.9610 \times 10^{-4},$
$G = 1.6897 \times 10^{-4}, H = 0$ Sixth surface ($r_6$)

$K = 0$
$E = 7.8664 \times 10^{-4}, F = 2.6525 \times 10^{-6},$
$G = 3.4439 \times 10^{-7}, H = 0$ Eleventh surface ($r_{11}$)

$K = 0$
$E = 5.7843 \times 10^{-5}, F = -4.7032 \times 10^{-6},$
$G = 7.9080 \times 10^{-8}, H = 0$

|  | W ∞ | W 1m | T ∞ | T 1m |
|---|---|---|---|---|
| $D_1$ | 2.000 | 3.500 | 2.000 | 3.500 (mm) |
| $D_2$ | 2.993 | 2.993 | 1.182 | 1.182 (mm) |
| $D_3$ | 23.415 | 23.415 | 36.434 | 63.434 (mm) |
| $\epsilon 1$ | 0 | −7.9 | 0 | −7.9 (°) |
| $\delta 1$ | 0 | 1.3 | 0 | 1.3 (mm) |
| $\gamma$ | 0.470 | 0.448 | 0.780 | 0.747 |
| $\omega_F$ | 25.03 | 26.30 | 15.02 | 15.77 (°) |
| Field factor | 87.7 | 90.4 | 87.7 | 90.1 (%) |

Since the ninth embodiment is constructed as mentioned above, the finder magnification decreases and the angle of view widens when the diopter of the finder is corrected. Consequently, although the angles of view of the photographic lens and the finder vary with the object distance, the field factor is practically constant. Further, the relationship between the movement of the correcting lens and the object is constant, irrespective of the zoom condition, thus allowing the simplification and high-speed processing of the calculation of movement of the correcting lens. Moreover, the amounts of changes of the diopter, parallax, and field factor can be predicted by fetching the zoom condition as data to be calculated and processed. Thus, when the correcting lens of the finder is moved only in the case where the amount of change is relatively large, effective control becomes possible.

Tenth Embodiment

Figure 38A:
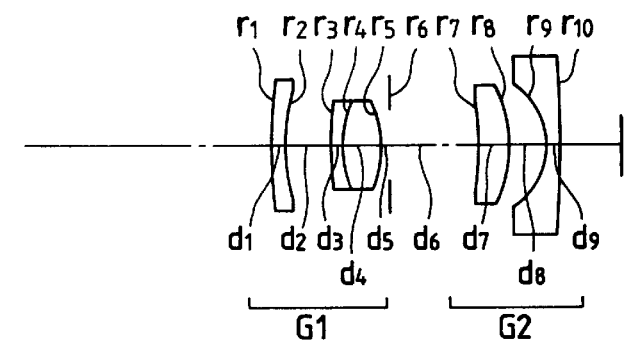
FIGS. 38A and 38B are developed views showing arrangements of the photographing optical system at wide-angle and telephoto positions, respectively, in a tenth embodiment of the present invention.
Figure 38B:
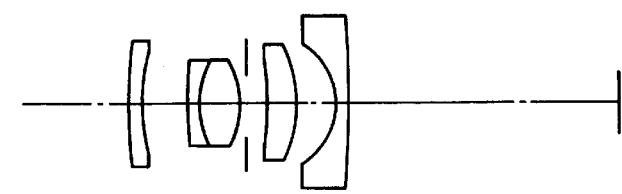

This embodiment is such that the photographing optical system, as depicted in FIGS. 38A and 38B, is constructed as a two-component zoom lens including the first lens unit $G_1$ composed of a negative lens and a positive cemented lens, having a positive refracting power as a whole and the second unit $G_2$ composed of a positive lens and a negative lens, having a negative refracting power as a whole. The second unit $G_2$ is shifted to perform focusing, by which the angle of view is increased at the wide-angle position and decreased at the telephoto position over the range from the infinite distance to the minimum distance.

On the other hand, the finder, as shown in FIGS. 39A–39D, is constructed with the objective system 1 having a positive refracting power, the field lens 25, and the eyepiece system 20 composed of the fourfold-reflecting prism 6 and the positive lens 7. The objective system 1 is a two-component zoom lens including the first unit $G_1$ composed of two positive lenses and the second unit $G_2$ composed of two negative lenses, so that the first unit $G_1$ and the second unit $G_2$ move when magnification is changed. The field frame 15 for defining the field range is disposed adjacent to the plane of incidence of the prism of the eyepiece system 20.

In the tenth embodiment, to coincide with the change of the angle of view of the photographic lens caused by focusing, a second lens located on the eyepiece system side, of two lenses of the second unit $G_2$ of the finder objective system, is moved along the optical axis to thereby correct diopter. For parallax correction, the frame member is moved in a direction perpendicular to the optical axis. The movements of individual members are calculated by the object distance data from the focus detectors and the zoom data from the photographic lens.

The numerical data of the tenth embodiment are as follows:

Photographic lens $r_1 = 83.5479$
  $d_1 = 2.000$  $n_1 = 1.49241$  $\nu_1 = 57.66$
$r_2 = 50.8906$ (aspherical)
  $d_2 = 6.643$
$r_3 = 60.5568$
  $d_3 = 1.600$  $n_3 = 1.59270$  $\nu_3 = 35.30$
$r_4 = 16.6254$
  $d_4 = 5.783$  $n_4 = 1.49782$  $\nu_4 = 66.83$
$r_5 = -15.1887$
  $d_5 = 0.936$
$r_6 =$ (stop)
  $d_6 = D_1$ (variable)
$r_7 = -36.3535$ (aspherical)
  $d_7 = 4.236$  $n_7 = 1.49241$  $\nu_7 = 57.66$
$r_8 = -22.5844$ (aspherical)
  $d_8 = 5.557$
$r_9 = -11.0049$
  $d_9 = 1.886$  $n_9 = 1.48749$  $\nu_9 = 70.21$
$r_{10} = -193.7938$ -continued Aspherical coefficients Second surface ($r_2$)

K = 6.2967
E = $2.0592 \times 10^{-7}$, F = $2.7824 \times 10^{-9}$,
G = $4.8829 \times 10^{-11}$, H = 0

Seventh surface ($r_7$)

K = 0
E = $-3.7920 \times 10^{-7}$, F = $1.2606 \times 10^{-7}$,
G = $-3.0141 \times 10^{-9}$, H = 0

Eighth surface ($r_8$)

K = 0.0044
E = $-4.3684 \times 10^{-5}$, F = $6.4361 \times 10^{-7}$,
G = $-1.5684 \times 10^{-8}$, H = 0

|  | W ∞ | W 1m | T ∞ | T 1m |
|---|---|---|---|---|
| $D_1$ | 13.292 | 15.650 | 3.199 | 4.323 (mm) |
| ω | 28.20 | 28.47 | 17.55 | 17.27 (°) |

Finder $r_1$ = −5.947 (aspherical)
    $d_1$ = 8.00    $n_1$ = 1.49241    $v_1$ = 57.66
$r_2$ = −7.671
    $d_2$ = 0.03
$r_3$ = 13.455
    $d_3$ = 6.48    $n_3$ = 1.49241    $v_3$ = 57.66
$r_4$ = −10.069 (aspherical)
    $d_4$ = $D_1$ (variable)
$r_5$ = −9.132 (aspherical)
    $d_5$ = 1.00    $n_5$ = 1.58423    $v_5$ = 30.49
$r_6$ = 89.015
    $d_6$ = $D_2$ (variable)
$r_7$ = −47.427
    $d_7$ = 1.00    $n_7$ = 1.58423    $v_7$ = 30.49
$r_8$ = −138.936
    $d_8$ = $D_3$ (variable)
$r_9$ = 15.281
    $d_9$ = 3.00    $n_9$ = 1.49241    $v_9$ = 57.66
$r_{10}$ = ∞
    $d_{10}$ = 2.00
$r_{11}$ = ∞
    $d_{11}$ = 39.50    $n_{11}$ = 1.49241    $v_{11}$ = 57.66
$r_{12}$ = −60.000
    $d_{12}$ = 1.00
$r_{13}$ = 24.248 (aspherical)
    $d_{13}$ = 2.50    $n_{13}$ = 1.49241    $v_{11}$ = 57.66
$r_{14}$ = −63.120
    $d_{14}$ = 13.50
$r_{15}$ = (eyepoint)

Aspherical coefficients

First surface ($r_1$)

K = 0
E = $-2.5307 \times 10^{-4}$, F = $-4.6956 \times 10^{-5}$,
G = $-4.1702 \times 10^{-7}$, H = 0

Fourth surface ($r_4$)

K = 0
E = $3.8932 \times 10^{-4}$, F = $-2.5376 \times 10^{-7}$,
G = $7.2986 \times 10^{-9}$, H = 0

Fifth surface ($r_5$)

K = 0
E = $3.1099 \times 10^{-4}$, F = $3.2293 \times 10^{-6}$,
G = $-2.5062 \times 10^{-8}$, H = 0

Thirteenth surface ($r_{13}$)

K = 0
E = $5.7843 \times 10^{-5}$, F = $-4.7032 \times 10^{-6}$,
G = $7.9080 \times 10^{-8}$, H = 0

|  | W ∞ | W 1m | T ∞ | T 1m |
|---|---|---|---|---|
| $D_1$ | 4.268 | 4.268 | 1.200 | 1.200 (mm) |
| $D_2$ | 0.710 | 2.359 | 0.710 | 2.210 (mm) |
| $D_3$ | 3.849 | 2.200 | 19.878 | 18.378 (mm) |
| γ | 0.450 | 0.446 | 0.780 | 0.782 |
| $ω_F$ | 25.97 | 26.27 | 15.26 | 15.31 (°) |
| Field factor | 90.8 | 91.0 | 86.3 | 88.0 (%) |

Since the tenth embodiment is constructed as mentioned above, the finder magnification reduces and the angle of view increases at the wide-angle position because of the diopter correction of the finder. At the telephoto position, however, the magnification increases, but the angle of view narrows slightly by the influence of aberration. Hence, although the angles of view of the photographing lens and the finder vary with the object distance, the change of the field factor is slight.

Eleventh Embodiment

Figure 40A:
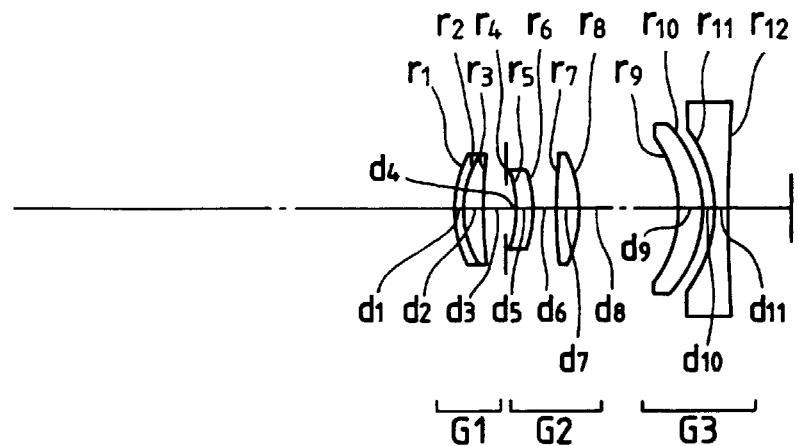
FIGS. 40A and 40B are developed views showing arrangements of the photographing optical system at wide-angle and telephoto positions, respectively, in an eleventh embodiment of the present invention.
Figure 40B:
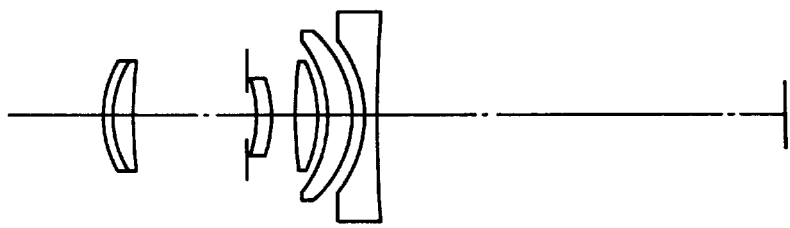

This embodiment is such that the photographing optical system, as shown in FIGS. 40A and 40B, is constructed as a three-component zoom lens composed of the first unit $G_1$ of a positive refracting power, the second unit $G_2$ of a positive refracting power, and the third unit $G_3$ of a negative refracting power. The second unit $G_2$ is shifted to perform focusing, by which the angle of view of the photographic lens is increased over the range from the infinite distance to the minimum distance.

On the other hand, the finder, as shown in FIGS. 41A–41D, is constructed with the objective system 1 having a positive refracting power, the field lens 25, and the eyepiece system 20 composed of the fourfold-reflecting prism 6 and the positive lens 7. The objective system 1 is a three-component zoom lens including the first unit $G_1$ composed of two negative lenses, the second unit $G_2$ of a positive lens, and the third unit $G_3$ of a positive lens, so that the second unit $G_2$ and the third unit $G_3$ move when magnification is changed. The field frame 15 for defining the field range is disposed adjacent to the plane of incidence of the prism of the eyepiece system 20.

In order to coincide with the change of the angle of view of the photographic lens caused by focusing, the first lens $L_1$ located on the object side, of two lenses of the first unit $G_1$ of the finder objective system, is moved along the optical axis to thereby make the diopter correction, and decentered and moved to make the parallax correction. The movements of these lenses are calculated by the object distance data from the focus detectors.

The numerical data of the eleventh embodiment are as follows:

Photographic lens $r_1$ = 15.963
    $d_1$ = 1.20    $n_1$ = 1.84666    $v_1$ = 23.78
$r_2$ = 13.692
    $d_2$ = 2.68    $n_2$ = 1.49700    $v_1$ = 81.86
$r_3$ 35.671
    $d_3$ = $D_1$ (variable)
$r_4$ = (stop)
    $d_4$ = 1.00
$r_5$ = −13.226

-continued $r_6 = -20.596$
$d_5 = 2.13$    $n_5 = 1.72916$    $v_5 = 54.68$
$d_6 = 3.07$
$r_7 = 40.297$
$d_7 = 3.22$    $n_7 = 1.45600$    $v_7 = 90.31$
$r_8 = -14.177$ (aspherical)
$d_8 = D_2$ (variable)
$r_9 = -15.267$
$d_9 = 3.22$    $n_9 = 1.78472$    $v_9 = 25.68$
$r_{10} = -13.247$ (aspherical)
$d_{10} = 1.53$
$r_{11} = -14.199$ (aspherical)
$d_{11} = 1.80$    $n_{11} = 1.69680$    $v_{11} = 56.47$
$r_{12} = 246.775$ Aspherical coefficients Eighth surface ($r_8$)

$K = 0$
$E = 7.6250 \times 10^{-5}, F = 4.0417 \times 10^{-7},$
$G = -3.4769 \times 10^{-9}, H = -1.0227 \times 10^{-13}$ Tenth surface ($r_{10}$)

$K = -0.1335$
$E = 3.3571 \times 10^{-5}, F = -3.6226 \times 10^{-7},$
$G = 4.0795 \times 10^{-9}, H = 0$ Eleventh surface ($r_{11}$)

$K = 0.0549$
$E = 7.3312 \times 10^{-5}, F = -3.0325 \times 10^{-7},$
$G = 3.8087 \times 10^{-9}, H = 0$

|  | W ∞ | W 1m | T ∞ | T 1m |
|---|---|---|---|---|
| $D_1$ | 3.470 | 1.482 | 15.272 | 12.728 (mm) |
| $D_2$ | 13.170 | 14.188 | 1.368 | 2.912 (mm) |
| ω | 28.74 | 29.14 | 11.44 | 11.60 (°) |

Finder $r_1 = -166.736$
$d_1 = 1.00$    $n_1 = 1.58423$    $v_1 = 30.49$
$r_2 = 24.823$
$d_2 = D_1$ (variable)
$r_3 = 19.156$
$d_3 = 3.00$    $n_3 = 1.58423$    $v_3 = 30.49$
$r_4 = 5.927$ (aspherical)
$d_4 = D_2$ (variable)
$r_5 = 5.354$ (aspherical)
$d_5 = 3.05$    $n_5 = 1.49241$    $v_5 = 57.66$
$r_6 = 11.786$
$d_6 = D_3$ (variable)
$r_7 = 26.871$
$d_7 = 2.35$    $n_7 = 1.49241$    $v_7 = 57.66$
$r_8 = -13.865$ (aspherical)
$d_8 = D_4$ (variable)
$r_9 = 12.808$
$d_9 = 3.00$    $n_9 = 1.49241$    $v_9 = 57.66$
$r_{10} = \infty$
$d_{10} = 2.00$
$r_{11} = \infty$
$d_{11} = 39.50$    $n_{11} = 1.49241$    $v_{11} = 57.66$
$r_{12} = -60.000$
$d_{12} = 1.00$
$r_{13} = 24.248$ (aspherical)
$d_{13} = 2.50$    $n_{13} = 1.49241$    $v_{13} = 57.66$
$r_{14} = -63.120$
$d_{14} = 13.50$
$r_{15} =$ (eyepoint)

Aspherical coefficients

Fourth surface ($r_4$)

$K = 0$
$E = -3.9364 \times 10^{-4}, F = -4.0289 \times 10^{-5},$
$G = 4.6427 \times 10^{-7}, H = 0$ Fifth surface ($r_5$)

$K = 0$
$E = -7.4338 \times 10^{-4}, F = -2.5099 \times 10^{-5},$
$G = 4.1116 \times 10^{-7}, H = 0$ Eighth surface ($r_8$)

$K = 0$
$E = 4.9749 \times 10^{-4}, F = -1.1879 \times 10^{-4},$
$G = 1.0396 \times 10^{-5}, H = 0$ Thirteenth surface ($r_{13}$)

$K = 0$
$E = 5.7843 \times 10^{-5}, F = -4.7032 \times 10^{-6},$
$G = 7.9080 \times 10^{-8}, H = 0$

|  | W ∞ | W 1m | T ∞ | T 1m |
|---|---|---|---|---|
| $D_1$ | 3.000 | 5.500 | 3.000 | 5.500 (mm) |
| $D_2$ | 5.189 | 5.189 | 1.324 | 1.324 (mm) |
| $D_3$ | 18.532 | 18.532 | 1.682 | 1.682 (mm) |
| $D_4$ | 17.450 | 17.450 | 38.165 | 38.165 (mm) |
| ε1 | 0 | 5.3 | 0 | 5.3 (°) |
| δ1 | 0 | 1.4 | 0 | 1.4 (mm) |
| γ | 0.380 | 0.364 | 1.020 | 0.987 |
| $ω_F$ | 25.06 | 26.35 | 9.66 | 10.42 (°) |
| Field factor | 85.3 | 88.8 | 84.1 | 89.5 (%) |

In the eleventh embodiment constructed as mentioned above, the finder magnification reduces and the angle of view increases when the diopter is corrected. Thus, although the angles of view of the photographic lens and the finder vary with the object distance, the field factor is practically constant.

Twelfth Embodiment

In this embodiment, the photographic lens, which is the same as that of the tenth embodiment shown in FIGS. 38A and 38B, is constructed as a two-component zoom lens of positive and negative and performs focusing by shifting the second unit. This focusing, ranging from the infinite distance to the minimum distance, causes the angle of view of the photographic lens to increase at the wide-angle position and to decrease at the telephoto position.

Figure 42A:
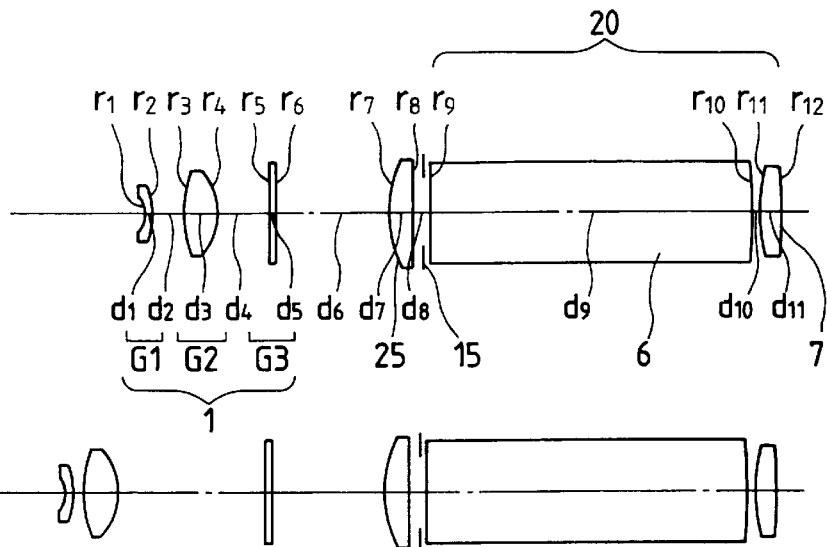
FIGS. 42A, 42B, 42C, and 42D are developed views showing arrangements of the finder optical system at the wide-angle position for an infinite object point, telephoto position for an infinite object point, wide-angle position for object point 1 m, and telephoto position for object point 1 m, respectively, in a twelfth embodiment of the present invention.
Figure 42B:
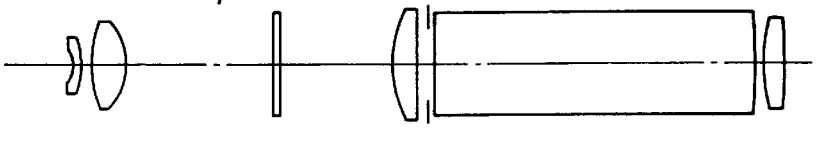
Figure 42C:
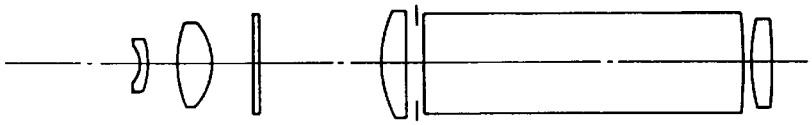
Figure 42D:
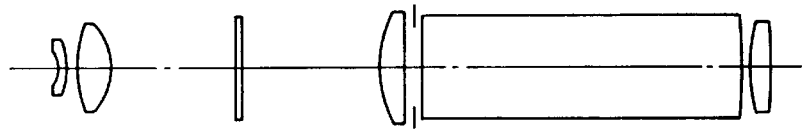

On the other hand, the finder, as shown in FIGS. 42A and 42D, is constructed with the objective system 1 having a positive refracting power, the field lens 25, and the eyepiece system 20 composed of the fourfold-reflecting prism 6 and the positive lens 7. The objective system 1 is a three-component zoom lens including the first unit $G_1$ composed of a negative lens, the second unit $G_2$ of a positive lens, and the third unit $G_3$ of a positive lens, so that the first unit $G_1$ and the second unit $G_2$ move when magnification is changed. The frame member 15 for defining the field range is disposed adjacent to the plane of incidence of the prism of the eyepiece system 20.

In order to coincide with the change of the angle of view of the photographic lens caused by focusing, a single lens constituting the third unit $G_3$ is moved along the optical axis to thereby make the diopter correction. For the parallax correction, the frame member is moved in a direction perpendicular to the optical axis. The movements of these optical members are calculated by the object distance data from the focus detectors and the data in the zoom condition of the photographic lens.

The numerical data of the eleventh embodiment are as follows: Finder

Finder $r_1 = -3.593$ (aspherical)
$\quad d_1 = 1.00 \quad n_1 = 1.58423 \quad v_1 = 30.49$
$r_2 = -11.763$
$\quad d_2 = D_1$ (variable)
$r_3 = 14.951$
$\quad d_3 = 1.00 \quad n_3 = 1.49241 \quad v_3 = 57.66$
$r_4 = -6.778$ (aspherical)
$\quad d_4 = D_2$ (variable)
$r_5 = 222.951$
$\quad d_5 = 4.71 \quad n_5 = 1.58423 \quad v_5 = 30.49$
$r_6 = -219.193$
$\quad d_6 = D_3$ (variable)
$r_7 = 16.915$
$\quad d_7 = 3.00 \quad n_7 = 1.49241 \quad v_7 = 57.66$
$r_8 = \infty$
$\quad d_8 = 2.00$
$r_9 = \infty$
$\quad d_9 = 39.50 \quad n_9 = 1.49241 \quad v_9 = 57.66$
$r_{10} = -60.00$
$\quad d_{10} = 1.00$
$r_{11} = 24.248$ (aspherical)
$\quad d_{11} = 2.50 \quad n_{11} = 1.49241 \quad v_{11} = 57.66$
$r_{12} = -63.120$
$\quad d_{12} = 13.50$
$r_{13} = $ (eyepoint)

Aspherical coefficients

First surface ($r_1$)

$K = 0$
$E = 1.8894 \times 10^{-4}, F = 3.3354 \times 10^{-4},$
$G = -3.1149 \times 10^{-5}, H = 0$ Fourth surface ($r_4$)

$K = 0$
$E = 5.5206 \times 10^{-4}, F = 6.3540 \times 10^{-6},$
$G = 1.5403 \times 10^{-7}, H = 0$ Eleventh surface ($r_{11}$)

$K = 0$
$E = 5.7843 \times 10^{-5}, F = -4.7032 \times 10^{-6},$
$G = 7.9080 \times 10^{-8}, H = 0$

|  | W ∞ | W 1m | T ∞ | T 1m |
|---|---|---|---|---|
| $D_1$ | 3.455 | 3.455 | 1.197 | 1.197 (mm) |
| $D_2$ | 6.009 | 4.869 | 17.946 | 14.946 (mm) |
| $D_3$ | 14.000 | 15.140 | 14.000 | 17.000 (mm) |
| γ | 0.470 | 0.470 | 0.780 | 0.781 |
| $\omega_F$ | 24.95 | 25.01 | 15.06 | 15.14 (°) |
| Field factor | 86.8 | 86.0 | 85.1 | 87.0 (%) |

Since the twelfth embodiment is constructed as mentioned above, the finder magnification reduces and the angle of view increases at the wide-angle position because of the diopter correction of the finder. At the telephoto position, however, the magnification increases, but the angle of view narrows slightly by the influence of aberration. Hence, although the angles of view of the photographing lens and the finder vary with the object distance, the change of the field factor is slight.

Thirteenth Embodiment

In this embodiment, the photographic lens, which is the same as that of the eleventh embodiment shown in FIGS. 40A and 40B, is constructed as a three-component zoom lens composed of the first unit $G_1$ of a positive refracting power, the second unit $G_2$ of a positive refracting power, and the third unit $G_3$ of a negative refracting power. The second unit $G_2$ is shifted to perform focusing. When the focusing is performed from the infinite distance to the minimum distance, the angle of view increases.

Figure 43A:
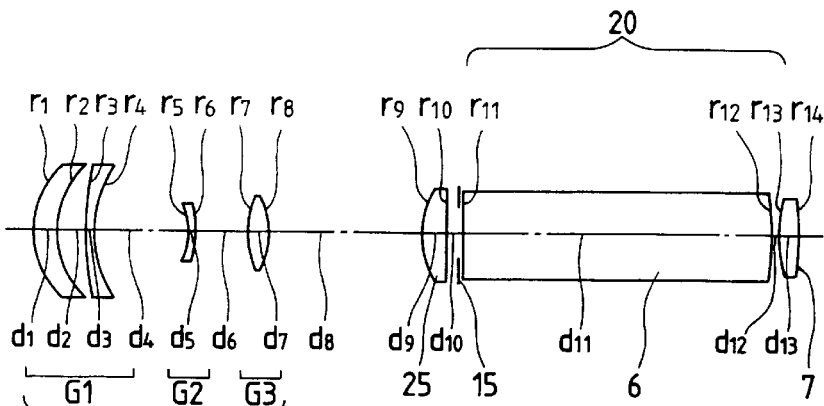
FIGS. 43A, 43B, 43C, and 43D are developed views showing arrangements of the finder optical system at the wide-angle position for an infinite object point, telephoto position for an infinite object point, wide-angle position for object point 1 m, and telephoto position for object point 1 m, respectively, in a thirteenth embodiment of the present invention.
Figure 43B:
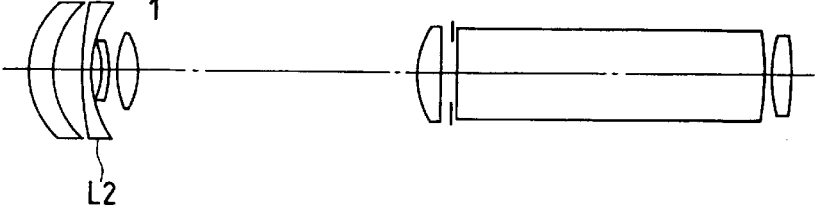
Figure 43C:
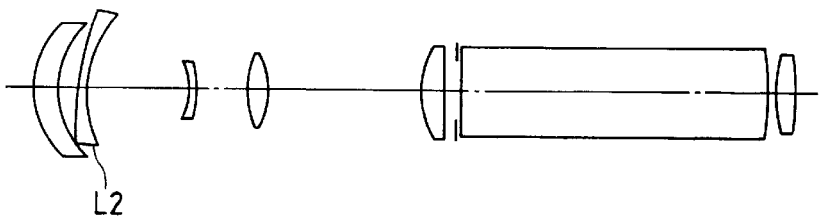
Figure 43D:
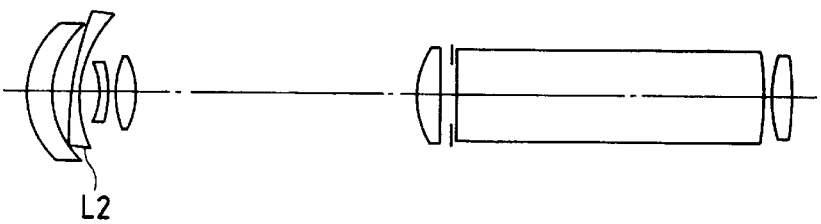

On the other hand, the finder, as shown in FIGS. 43A and 43D, is constructed with the objective system 1 having a positive refracting power, the field lens 25, and the eyepiece system 20 composed of the fourfold-reflecting prism 6 and the positive lens 7. The objective system 1 is a three-component zoom lens including the first unit $G_1$ composed of two lenses, the second unit $G_2$ of a negative lens, and the third unit $G_3$ of a positive lens, so that the second unit $G_2$ and the third unit $G_3$ move when magnification is changed. The frame member 15 for defining the field range is disposed adjacent to the plane of incidence of the prism of the eyepiece system 20.

In order to coincide with the change of the angle of view of the photographic lens caused by focusing, a second lens $L_2$ situated on the eyepiece system side, of the two lenses constituting the first unit $G_1$ of the finder objective system is moved along the optical axis to thereby make the diopter correction. For the parallax correction, the second lens $L_2$ of the first unit $G_1$ is decentered and moved. The movements of these lenses are calculated by the object distance data from the focus detectors.

The numerical data of the thirteenth embodiment are as follows:

Finder $r_1 = 12.765$
$\quad d_1 = 3.02 \quad n_1 = 1.58423 \quad v_1 = 30.49$
$r_2 = 11.271$ (aspherical)
$\quad d_2 = D_1$ (variable)
$r_3 = 44.383$
$\quad d_3 = 1.00 \quad n_3 = 1.58423 \quad v_3 = 30.49$
$r_4 = 14.631$ (aspherical)
$\quad d_4 = D_2$ (variable)
$r_5 = -6.840$ (aspherical)
$\quad d_5 = 1.01 \quad n_5 = 1.58423 \quad v_5 = 30.49$
$r_6 = -14.132$
$\quad d_6 = D_3$ (variable)
$r_7 = 15.267$
$\quad d_7 = 2.69 \quad n_7 = 1.49241 \quad v_7 = 57.66$
$r_8 = -9.857$ (aspherical)
$\quad d_8 = D_4$ (variable)
$r_9 = 14.023$
$\quad d_9 = 3.00 \quad n_9 = 1.49241 \quad v_9 = 57.66$
$r_{10} = \infty$
$\quad d_{10} = 2.00$
$r_{11} = \infty$
$\quad d_{11} = 39.50 \quad n_{11} = 1.49241 \quad v_{11} = 57.66$
$r_{12} = -60.000$
$\quad d_{12} = 1.00$
$r_{13} = 24.248$ (aspherical)
$\quad d_{13} = 2.50 \quad n_{13} = 1.49241 \quad v_{13} = 57.66$
$r_{14} = -63.120$
$\quad d_{14} = 13.50$
$r_{15} = $ (eyepoint)

Aspherical coefficients

Second surface ($r_2$)

$K = 0$
$E = 9.5543 \times 10^{-6}, F = -2.1601 \times 10^{-6},$
$G = 2.3038 \times 10^{-8}, H = 0$ Fourth surface ($r_4$)

$K = 0$
$E = 9.5543 \times 10^{-6}, F = 9.5543 \times 10^{-6},$
$G = -2.1601 \times 10^{-6}, H = 0$ Fifth surface ($r_5$)

-continued

K = 0
E = 3.3960 × 10$^{-4}$, F = -3.8876 × 10$^{-5}$,
G = 4.7875 × 10$^{-6}$, H = 0
Eighth surface ($r_8$)

K = 0
E = 4.3448 × 10$^{-4}$, F = -2.8390 × 10$^{-6}$,
G = -1.5265 × 10$^{-7}$, H = 0
Thirteenth surface ($r_{13}$)

K = 0
E = 5.7843 × 10$^{-5}$, F = -4.7032 × 10$^{-6}$,
G = 7.9080 × 10$^{-8}$, H = 0

|  | W ∞ | W 1m | T ∞ | T 1m |
|---|---|---|---|---|
| $D_1$ | 3.943 | 2.943 | 3.943 | 2.943 (mm) |
| $D_2$ | 12.527 | 13.527 | 1.500 | 2.500 (mm) |
| $D_3$ | 6.581 | 6.581 | 1.200 | 1.200 (mm) |
| $D_4$ | 20.164 | 20.164 | 36.572 | 36.572 (mm) |
| $\epsilon 1$ | 0 | 8.0 | 0 | 8.0 (°) |
| $\delta 1$ | 0 | 1.8 | 0 | 1.8 (mm) |
| $\gamma$ | 0.410 | 0.404 | 1.100 | 1.083 |
| $\omega_F$ | 24.94 | 25.38 | 9.58 | 9.89 (°) |
| Field factor | 84.8 | 85.1 | 83.4 | 84.9 (%) |

In the thirteenth embodiment constructed as mentioned above, the finder magnification reduces and the angle of view increases when the diopter is corrected. Thus, although the angles of view of the photographic lens and the finder vary with the object distance, the field factor is practically constant.

Fourteenth Embodiment

In this embodiment, the photographic lens is constructed as two-component zoom lens which is identical with that of the ninth embodiment shown in FIGS. 36A and 36B. This photographic lens is such that its entire lens system is shifted for focusing and the angle of view decreases when the focusing is performed from the infinite distance to the minimum distance.

Figure 44A:
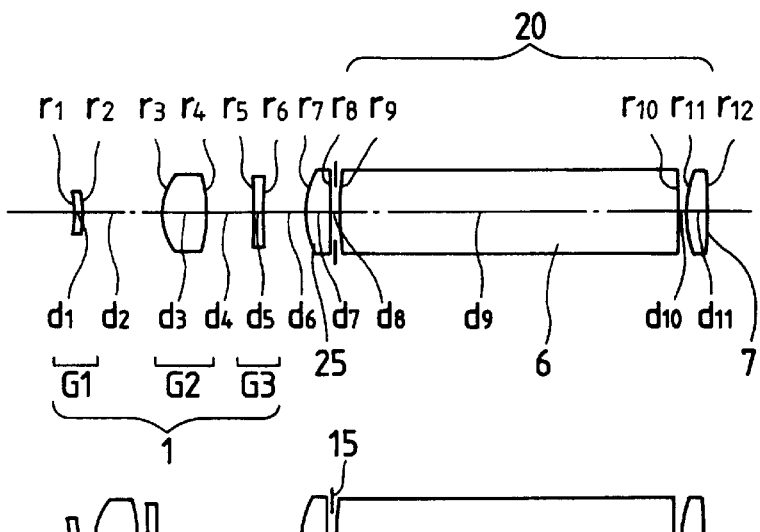
FIGS. 44A and 44B are developed views showing arrangements of the finder optical system at the wide-angle position for an infinite object point and telephoto position for an infinite object point, respectively, in a fourteenth embodiment of the present invention.
Figure 44B:
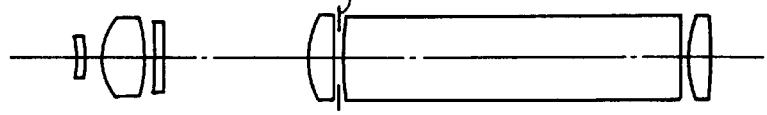

On the other hand, the finder, as shown in FIGS. 44A and 44B, is constructed with the objective system 1 having a positive refracting power, the field lens 25, and the eyepiece system 20 composed of the fourfold-reflecting prism 6 and the positive lens 7. The objective system 1 is a three-component zoom lens including the first unit $G_1$ composed of a negative lens, the second unit $G_2$ of a positive lens, and the third unit $G_3$ of a negative lens, so that all the first, second, and third units move when magnification is changed. The frame member 15 for defining the field range is disposed adjacent to the plane of incidence of the prism of the eyepiece system 20.

In order to coincide with the change of the angle of view of the photographic lens caused by focusing, the second unit of the objective system is moved along the optical axis to thereby make the diopter correction. For the parallax correction, the frame member is moved in a direction perpendicular to the optical axis. The movements of these optical members are calculated by the object distance data from the focus detectors and the zoom data from the photographic lens.

The numerical data of the fourteenth embodiment are as follows:

Photographic lens $r_1$ = 215.020
  $d_1$ = 1.83    $n_1$ = 1.80400    $\nu_1$ = 46.57
$r_2$ = 17.159 (aspherical)
  $d_2$ = 6.77
$r_3$ = 27.092
  $d_3$ = 3.00    $n_3$ = 1.76182    $\nu_3$ = 26.52
$r_4$ = 58.392
  $d_4$ = $D_1$ (variable)
$r_5$ = (stop)
  $d_5$ = 1.00
$r_6$ = 13.465 (aspherical)
  $d_6$ = 7.52    $n_6$ = 1.56873    $\nu_6$ = 63.16
$r_7$ = -17.694
  $d_7$ = 1.50    $n_7$ = 1.63636    $\nu_7$ = 35.37
$r_8$ = 114.779
  $d_8$ = 4.71
$r_9$ = -45.604 (aspherical)
  $d_9$ = 1.88    $n_9$ = 1.77250    $\nu_9$ = 49.66
$r_{10}$ = -127.683
Aspherical coefficients Second surface ($r_2$)

K = 0.2761
E = -1.9169 × 10$^{-5}$, F = -1.2866 × 10$^{-8}$,
G = -5.2470 × 10$^{-10}$, H = 0
Sixth surface ($r_6$)

K = 0.054
E = 5.7808 × 10$^{-6}$, F = 1.0384 × 10$^{-7}$,
G = 4.9381 × 10$^{-10}$, H = 8.0171 × 10$^{-12}$
Ninth surface ($r_9$)

K = 0.6587
E = -9.1883 × 10$^{-5}$, F = -4.4647 × 10$^{-7}$,
G = -1.4988 × 10$^{-8}$, H = 0

|  | W ∞ | W 0.6m | T ∞ | T 0.6m |
|---|---|---|---|---|
| $D_1$ | 20.917 | 20.917 | 4.490 | 4.490 (mm) |
| $\omega$ | 28.04 | 26.73 | 15.39 | 13.47 (°) |

Finder $r_1$ = -16.444 (aspherical)
  $d_1$ = 1.00    $n_1$ = 1.58423    $\nu_1$ = 30.49
$r_2$ = 128.256
  $d_2$ = $D_1$ (variable)
$r_3$ = 7.656
  d3 = 5.22    $n_3$ = 1.49241    $\nu_3$ = 57.66
$r_4$ = -13.800 (aspherical)
  $d_4$ = $D_2$ (variable)
$r_5$ = -36.590
  $d_5$ = 1.00    $n_5$ = 1.58423    $\nu_5$ = 30.49
$r_6$ = 71.209 (aspherical)
  $d_6$ = $D_3$ (variable)
$r_7$ = 13.636
  $d_7$ = 2.90    $n_7$ = 1.49241    $\nu_7$ = 57.66
$r_8$ = ∞
  $d_8$ = 1.00
$r_9$ = 33.405
  $d_9$ = 39.50    $n_9$ = 1.49241    $\nu_9$ = 57.66
$r_{10}$ = ∞
  $d_{10}$ = 1.00
$r_{11}$ = 17.509 (aspherical)
  $d_{11}$ = 2.50    $n_{11}$ = 1.49241    $\nu_{11}$ = 57.66

-continued $r_{12} = -63.396$
$\quad d_{12} = 13.50$
$r_{13} = $ (eyepoint)
Aspherical coefficients First surface ($r_1$)

$K = 0$
$E = 3.0788 \times 10^{-5}, F = -4.0427 \times 10^{-5},$
$G = 6.2311 \times 10^{-6}, H = 0$
Fourth surface ($r_4$)

$K = 0$
$E = 6.5521 \times 10^{-4}, F = 5.8398 \times 10^{-6},$
$G = 1.0530 \times 10^{-7}, H = 0$
Sixth surface ($r_6$)

$K = 0$
$E = 8.6696 \times 10^{-6}, F = -1.9119 \times 10^{-7},$
$G = 3.5113 \times 10^{-7}, H = 0$
Eleventh surface ($r_{11}$)

$K = 0$
$E = 4.9100 \times 10^{-5}, F = -1.7743 \times 10^{-6},$
$G = 4.2481 \times 10^{-8}, H = 0$

|  | W ∞ | W 0.6m | T ∞ | T 0.6m |
|---|---|---|---|---|
| $D_1$ | 9.130 | 8.886 | 1.679 | 0.958 (mm) |
| $D_2$ | 5.670 | 5.915 | 1.049 | 1.770 (mm) |
| $D_3$ | 5.091 | 5.091 | 17.164 | 17.164 (mm) |
| $\gamma$ | 0.417 | 0.423 | 0.736 | 0.783 |
| $\omega_F$ | 24.30 | 23.87 | 13.16 | 12.33 (°) |
| Field factor | 84.8 | 89.9 | 84.9 | 91.3 (%) |

In the fourteenth embodiment constructed as mentioned above, the finder magnification reduces and the angle of view increases when the diopter is corrected. Thus, although the angles of view of the photographic lens and the finder vary with the object distance, there is little change in the field factor.

Fifteenth Embodiment

In this embodiment, the photographic lens, which is the same as that of the eleventh embodiment shown in FIGS. 40A and 40B, is constructed as a three-component zoom lens composed of the first unit $G_1$ of a positive refracting power, the second unit $G_2$ of a positive refracting power, and the third unit $G_3$ of a negative refracting power. The second unit $G_2$ is shifted to perform focusing. When the focusing is performed from the infinite distance to the minimum distance, the angle of view increases.

Figure 45A:
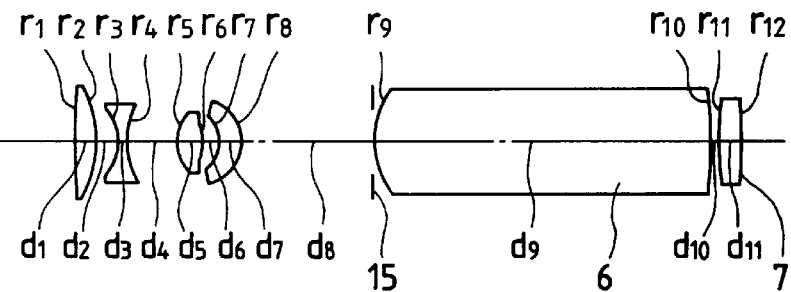
FIGS. 45A and 45B are developed views showing arrangements of the finder optical system at the wide-angle position for an infinite object point and telephoto position for an infinite object point, respectively, in a fifteenth embodiment of the present invention.
Figure 45B:
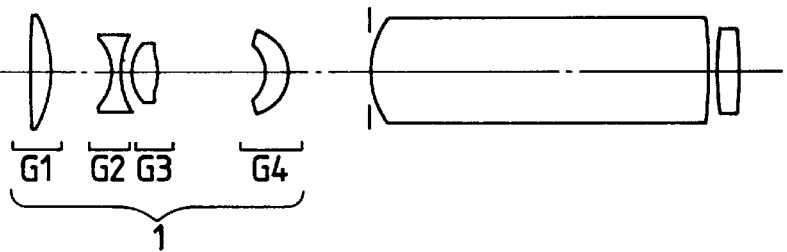

On the other hand, the finder, as shown in FIGS. 45A and 45B, is constructed with the objective system 1 having a positive refracting power, and the eyepiece system 20 composed of the fourfold-reflecting prism 6 and the positive lens 7. The objective system 1 is a four-component zoom lens including the first unit $G_1$ composed of a positive lens, the second unit $G_2$ of a negative lens, the third unit $G_3$ of a positive lens, and the fourth unit $G_4$ of a positive lens, so that the first, third, and fourth units move when magnification is changed. The frame member 15 for defining the field range is disposed adjacent to the plane of incidence of the prism of the eyepiece system 20.

In order to coincide with the change of the angle of view of the photographic lens caused by focusing, the single lens constituting the second unit $G_2$ of the finder objective system is moved along the optical axis to thereby make the diopter correction. For the parallax correction, the frame member is moved in a direction perpendicular to the optical axis. The movements of these optical members are calculated by the object distance data from the focus detectors and the zoom data from the photographic lens.

The numerical data of the fifteenth embodiment are as follows:

Finder $r_1 = 38.774$ (aspherical)
$\quad d_1 = 2.36 \quad n_1 = 1.49241 \quad \nu_1 = 57.66$
$r_2 = -15.357$
$\quad d_2 = D_1$ (variable)
$r_3 = -5.524$ (aspherical)
$\quad d_3 = 1.00 \quad n_3 = 1.58423 \quad \nu_3 = 30.49$
$r_4 = 9.927$
$\quad d_4 = D_2$ (variable)
$r_5 = 7.150$ (aspherical)
$\quad d_5 = 3.20 \quad n_5 = 1.49241 \quad \nu_5 = 57.66$
$r_6 = -7.500$ (aspherical)
$\quad d_6 = D_3$ (variable)
$r_7 = -4.252$ (aspherical)
$\quad d_7 = 2.64 \quad n_7 = 1.49241 \quad \nu_7 = 57.66$
$r_8 = -4.855$
$\quad d_8 = D_4$ (variable)
$r_9 = 11.392$
$\quad d_9 = 39.50 \quad n_9 = 1.49241 \quad \nu_9 = 57.66$
$r_{10} = -60.000$
$\quad d_{10} = 1.00$
$r_{11} = 24.248$ (aspherical)
$\quad d_{11} = 2.50 \quad n_{11} = 1.49241 \quad \nu_{11} = 57.66$
$r_{12} = -63.120$
$\quad d_{12} = 13.50$
$r_{13} = $ (eyepoint)
Aspherical coefficients First surface ($r_1$)

$K = 0$
$E = -1.9560 \times 10^{-4}, F = -2.1652 \times 10^{-6},$
$G = 3.4797 \times 10^{-8}, H = 0$
Third surface ($r_3$)

$K = 0$
$E = 6.9456 \times 10^{-4}, F = -1.3120 \times 10^{-4},$
$G = -1.3245 \times 10^{-6}, H = 9.6897 \times 10^{-8}$
Fifth surface ($r_5$)

$K = 0$
$E = -6.7571 \times 10^{-4}, F = 1.9544 \times 10^{-4},$
$G = 4.2332 \times 10^{-6}, H = -4.5168 \times 10^{-7}$
Sixth surface ($r_6$)

$K = 0$
$E = 1.8463 \times 10^{-3}, F = 9.1131 \times 10^{-5},$
$G = 2.0782 \times 10^{-5}, H = 0$
Seventh surface ($r_7$)

$K = 0$
$E = -3.4662 \times 10^{-4}, F = 9.7104 \times 10^{-5},$
$G = -1.0623 \times 10^{-5}, H = 0$
Eleventh surface ($r_{11}$)

$K = 0$
$E = -2.5603 \times 10^{-5}, F = -5.3664 \times 10^{-7},$
$G = 6.0045 \times 10^{-8}, H = 0$

|  | W ∞ | W 1m | T ∞ | T 1m |
|---|---|---|---|---|
| $D_1$ | 2.670 | 2.549 | 7.200 | 6.840 (mm) |
| $D_2$ | 5.797 | 5.918 | 1.000 | 1.360 (mm) |
| $D_3$ | 1.720 | 1.720 | 12.596 | 12.596 (mm) |
| $D_4$ | 15.691 | 15.691 | 10.000 | 10.000 (mm) |
| $\gamma$ | 0.410 | 0.402 | 1.140 | 1.052 |
| $\omega_F$ | 24.98 | 25.36 | 9.51 | 10.07 (°) |
| Field factor | 84.9 | 85.0 | 82.8 | 86.5 (%) |

In the fifteenth embodiment constructed as mentioned above, the finder magnification reduces and the angle of view increases when the diopter is corrected. Thus, although the angles of view of the photographic lens and the finder vary with the object distance, the change of the field factor becomes slight.

Figure 5A:
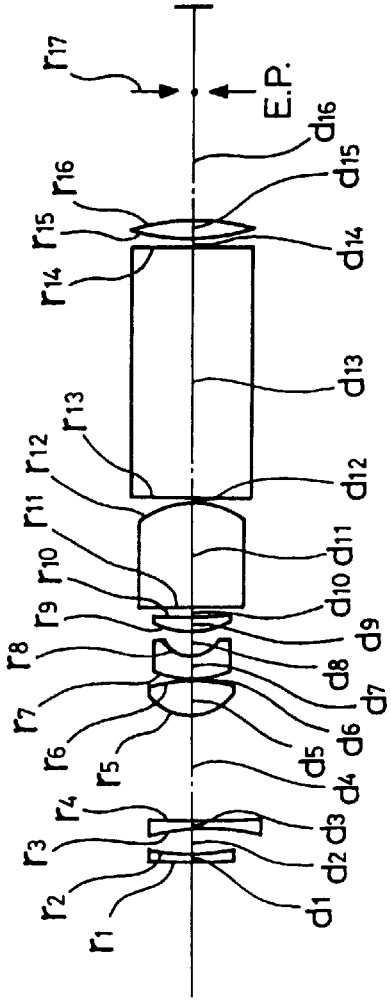
FIGS. 5A, 5B, and 5C are views showing arrangements developed along the optical axis of the finder optical system at wide-angle, middle, and telephoto positions, respectively, where an object distance is infinite in a first embodiment of the present invention.
Figure 5B:
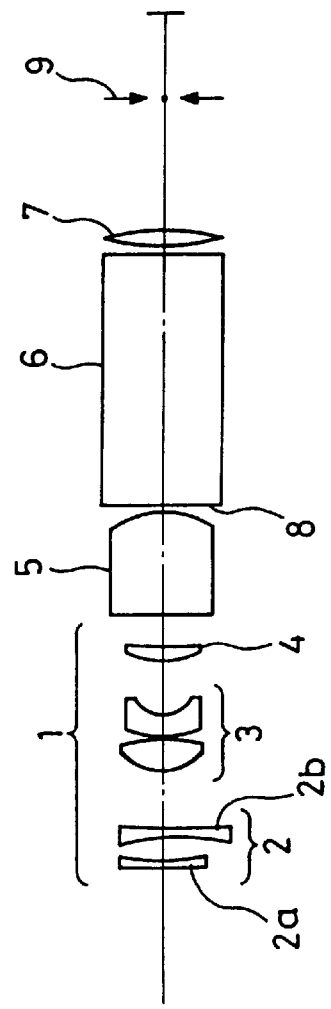
Figure 5C:
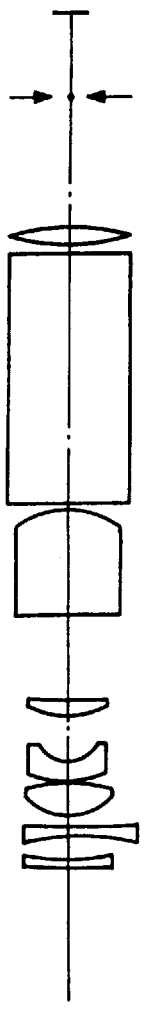
Figure 6A:
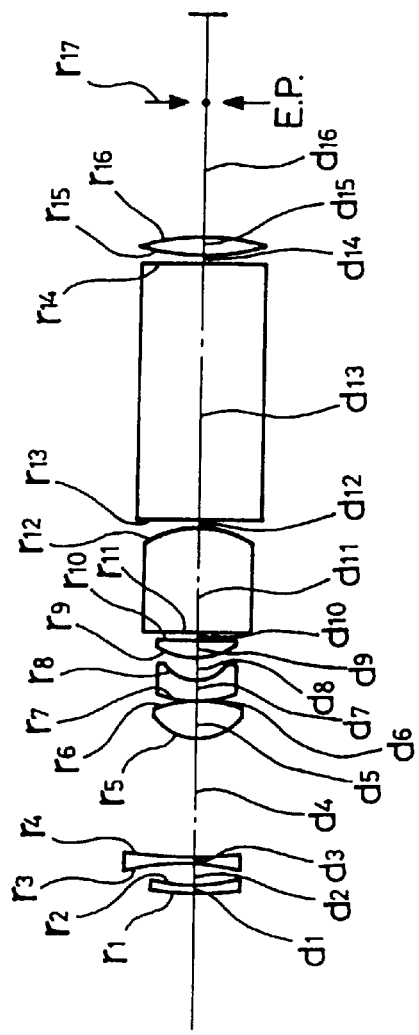
FIGS. 6A, 6B, and 6C are views showing arrangements developed along the optical axis of the finder optical system at wide-angle, middle, and telephoto positions, respectively, where the object distance is 0.6 m in the first embodiment.
Figure 6B:
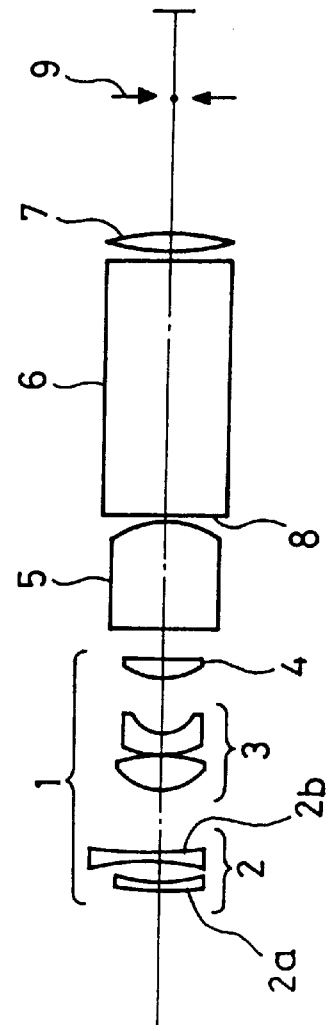
Figure 6C:
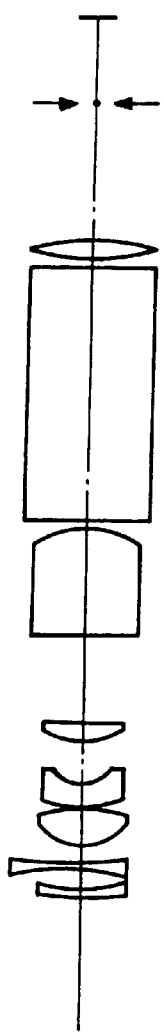
Figure 46:
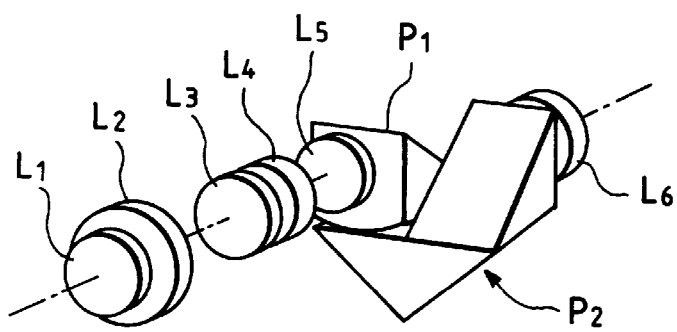
FIG. 46 is a perspective view typically showing the finder optical system of the present invention.

FIG. 46 is a perspective view showing the finder optical system, for example, in the first embodiment. Lenses $L_1$–$L_5$ are five ones denoted by $r_1$–$r_{10}$ in FIG. 5A, and a prism $P_1$ corresponds to a thick lens situated behind them. A long block shown in FIG. 5A is drawn by extending a prism $P_2$. Symbol $L_6$ is the eyepiece designated by $r_1$–$r_{16}$. The exit surface of the prism $P_1$ has a curvature, and the prism $P_2$ is spaced slightly from the prism $P_1$. The prism $P_2$ is constructed with two triangular prisms cemented. The object image is formed adjacent to the entrance surface of the prism $P_2$ (intermediate image plane 8).

For the other embodiments, although their perspective views are omitted, it will easily be understood from FIG. 46 what arrangements are made.

In each embodiment mentioned above, $r_1, r_2, \ldots$ represent radii of curvature (or surface numbers) of individual lens surfaces; $d_1, d_2, \ldots$ thicknesses of individual lenses or spaces therebetween; $n_1, n_2, \ldots$ refractive indices of individual lenses; and $v_1, v_2, \ldots$ Abbe's numbers of individual lenses. Symbol $2\omega$ denotes the angle of view of the photographic lens. Symbols W ∞, W 1 m, and W 0.6 m designate the data of an object at infinity, an object at a distance of 1 m, and an object at a distance of 0.6 m, respectively, at the wide-angle position; and W ∞, T 1 m, and T 0.6 m designate an object at infinity, an object at a distance of 1 m, and an object at a distance of 0.6 m, respectively, at the telephoto position.

Also, the configurations of aspherical surfaces in each embodiment are expressed by $$x = \frac{y^2/r}{1 + \sqrt{1-(1+K)(y/r)^2}} + Ey^4 + Fy^6 + Gy^8 + Hy^{10}$$

where x is the coordinates in the direction of the optical axis, y is the coordinates in the direction normal to the optical axis, r is the radius of curvature of a reference surface, and K, E, F, G, and H are coefficients representative of aspherical surfaces.

What is claimed is:

1. A finder optical system which is formed independent of photographing optical system, comprising:

an objective optical system for forming an intermediate image of an object, said objective optical system including a plurality of lens units; and an eyepiece optical system, said finder optical system having a reflecting member disposed between said objective optical system and said intermediate image, wherein one of said plurality of lens units of said objective optical system includes a correcting lens which is movably mounted along an optical axis of said finder optical system, said correcting lens being moved in accordance with a change of photographing distance from said object to perform a diopter correction of said finder optical system, each lens unit of said objective optical system exclusive of the lens unit having said correcting lens is fixed while said correcting lens is moved along the optical axis for the diopter correction, and said finder optical system satisfies a condition:

$$0.1 < |1000 \times \alpha_F/f_R^2| < 7.0$$

where $\alpha_F$ is a maximum longitudinal magnification of said correcting lens and $f_R$ is a focal length of said eyepiece optical system.

2. A finder optical system according to claim 1, wherein said correcting lens consists essentially of a single lens.

3. A finder optical system according to claims 1 or 2, wherein each distance between said plurality of lens units thereof is changeable for a variable magnification operation.

4. A finder optical system according to claim 3, wherein the variable magnification operation is performed irrespective of movement of the lens unit which includes said correcting lens.

5. A finder optical system according to claim 3, wherein the lens unit which includes said correcting lens is movable to perform the variable magnification operation.

6. A finder optical system according to claim 1, wherein said photographing optical system is provided with a focusing system for performing a focusing operation of said photographing optical system in accordance with a photographic distance to the object, and wherein movement of said correcting lens is performed based on information from said focusing system.

* * * * *